(12) United States Patent
Yoshida

(10) Patent No.: US 8,049,919 B2
(45) Date of Patent: Nov. 1, 2011

(54) IMAGE PROCESSING APPARATUS

(75) Inventor: Hitoshi Yoshida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 512 days.

(21) Appl. No.: 12/289,229

(22) Filed: Oct. 23, 2008

(65) Prior Publication Data

US 2009/0109485 A1    Apr. 30, 2009

(30) Foreign Application Priority Data

Oct. 29, 2007    (JP) ................................ 2007-280194

(51) Int. Cl.
*G06F 3/12* (2006.01)

(52) U.S. Cl. ....... 358/1.15; 358/1.14; 713/300; 713/320

(58) Field of Classification Search .............. 358/1.13, 358/1.14, 1.15; 713/300, 320
See application file for complete search history.

(56) References Cited

U.S. PATENT DOCUMENTS

| | | | | |
|---|---|---|---|---|
| 5,937,148 A * | 8/1999 | Okazawa | ...................... | 358/1.13 |
| 6,459,496 B1 * | 10/2002 | Okazawa | ...................... | 358/1.14 |
| 6,785,012 B2 * | 8/2004 | Okazawa | ...................... | 358/1.14 |
| 7,056,039 B2 * | 6/2006 | Mokuya et al. | ............. | 358/1.15 |
| 7,376,725 B2 * | 5/2008 | Takahashi et al. | ............. | 709/223 |
| 7,383,448 B2 * | 6/2008 | Kohara | .................... | 713/300 |
| 7,936,466 B2 * | 5/2011 | Kobayashi | .................. | 358/1.14 |
| 2002/0149789 A1 * | 10/2002 | Okazawa | ..................... | 358/1.14 |
| 2003/0191975 A1 * | 10/2003 | Kohara | ......................... | 713/300 |
| 2004/0170460 A1 * | 9/2004 | Mokuya et al. | .................. | 400/76 |
| 2004/0215759 A1 * | 10/2004 | Takahashi et al. | ............ | 709/223 |
| 2006/0274368 A1 * | 12/2006 | Imine | ........................... | 358/1.15 |
| 2006/0279766 A1 * | 12/2006 | Kobayashi | ................... | 358/1.14 |

FOREIGN PATENT DOCUMENTS

| | | |
|---|---|---|
| JP | 11-170666 | 6/1999 |
| JP | 11-219275 | 8/1999 |
| JP | 2000-056869 | 2/2000 |
| JP | 2002-016750 | 1/2002 |
| JP | 2002-166631 | 6/2002 |
| JP | 2007-210239 | 8/2007 |

* cited by examiner

*Primary Examiner* — Kimberly A Williams
(74) *Attorney, Agent, or Firm* — Kubotera & Associates, LLC

(57) ABSTRACT

An image processing apparatus is connected to a specific network for processing an image according to image information input to the image processing apparatus. The image processing apparatus includes an apparatus information storage unit for storing apparatus information of other apparatus connected to the network; an inquiry unit for inquiring an operational state of the other apparatus according to the apparatus information stored in the apparatus information storage unit; a determining unit for determining the operational state of the other apparatus according to an inquiry result of the inquiry unit; and a switching control unit for switching an operational state of the image processing apparatus between an active state and a power save state according to a number of apparatus that the determining unit determines as being in the active state.

13 Claims, 18 Drawing Sheets

|  | Daytime | Nighttime |
|---|---|---|
| Active state | 3 | 2 |
| Power save state | 1 | 1 |

FIG. 6 (A)

| | Network address | Operational state information | |
|---|---|---|---|
| v101 | 192.168.0.30 | Active state | v104 |
| v102 | 192.168.0.50 | Power save state | v105 |
| v103 | 192.168.0.55 | Trouble happening state | v106 |

# IMAGE PROCESSING APPARATUS

BACKGROUND OF THE INVENTION AND RELATED ART STATEMENT

The present invention relates to an image processing apparatus connected to a specific network for processing an image according to image information input to the image processing apparatus.

A conventional image processing apparatus such as a printer is often connected to a specific network such as an LAN (Local Area Network) and the likes in use. When the conventional image processing apparatus does not receive data for a specific period of time, the conventional image processing apparatus becomes a power save state (Power-Save), thereby reducing power consumption (refer to Patent Reference).

Patent Reference: Japan Patent Publication No. 2000-56869

When a plurality of printers as the conventional image processing apparatus is connected to the network, and all of the printers are in the power save state, it takes long time for one printer to become an active stat capable of printing, thereby making it difficult to deal with an emergency situation. This problem is not limited to the printers, and common in other image processing apparatus capable of being connected to a network.

In view of the problems described above, an object of the present invention is to provide an image processing apparatus capable of solving the problems of the conventional image processing apparatus while reducing power consumption.

Further objects and advantages of the invention will be apparent from the following description of the invention.

SUMMARY OF THE INVENTION

In order to attain the objects described above, according to a first aspect of the present invention, an image processing apparatus is connected to a specific network for processing an image according to image information input to the image processing apparatus.

In the first aspect of the present invention, the image processing apparatus includes an apparatus information storage unit for storing apparatus information of other apparatus connected to the network; an inquiry unit for inquiring an operational state of the other apparatus according to the apparatus information stored in the apparatus information storage unit; a determining unit for determining the operational state of the other apparatus according to an inquiry result of the inquiry unit; and a switching control unit for switching an operational state of the image processing apparatus between an active state and a power save state according to a number of apparatus that the determining unit determines as being in the active state.

In the image processing apparatus in the first aspect of the present invention, the inquiry unit inquires the operational state of the other apparatus, and the determining unit determines the number of the apparatus being in the active state according to the inquiry result of the inquiry unit. Then, the switching control unit switches an operational state of the image processing apparatus between the active state and the power save state according to a determination result of the determining unit. Accordingly, it is possible to prevent all of the apparatus from becoming the power save state while preventing unnecessary apparatus from becoming the active state at once.

According to a second aspect of the present invention, an image processing apparatus is connected to a specific network for processing an image according to image information input to the image processing apparatus.

In the second aspect of the present invention, the image processing apparatus includes an operational state information storage unit for storing operational state information of other apparatus connected to the network; a transmission unit for sending a notice to the other apparatus indicating that an operation state of the image processing apparatus changes; an updating unit for updating the operational state information stored in the operational state information storage unit according to a notice from the other apparatus indicating that an operation state thereof changes; a determining unit for determining a number of the other apparatus in an active state according to the operational state information stored in the operational state information storage unit; and a switching control unit for switching an operational state of the image processing apparatus between an active state and a power save state according to the number of the other apparatus that the determining unit determines as being in the active state.

In the image processing apparatus in the second aspect of the present invention, the transmission unit sends the notice to the other apparatus indicating that the operation state of the image processing apparatus changes. When the other apparatus send the notice indicating that the operation state thereof changes, the updating unit updates the operational state information stored in the operational state information storage unit.

Further, the determining unit determines the number of the other apparatus in the active state according to the operational state information stored in the operational state information storage unit. Then, the switching control unit switches the operational state of the image processing apparatus between the active state and the power save state according to a determination result of the determining unit. Accordingly, in a minimum period of time after the operational state of the image processing apparatus changes, it is possible to prevent all of the apparatus from becoming the power save state while preventing unnecessary apparatus from becoming the active state at once.

In the present invention, it is possible to prevent unnecessary apparatus from becoming the active state at once, thereby reducing power consumption. Further, it is possible to prevent all of the apparatus from becoming the power save state, thereby securing the apparatus capable of dealing with an emergency situation.

DETAILED DESCRIPTION OF THE PREFERRED EMBODIMENTS

Hereunder, embodiments of the present invention will be described in detail with reference to the accompanying drawings.

In the embodiments, an image processing system includes an image processing apparatus connected to a specific network for processing an image according to image information input to the image processing apparatus. In the image processing system, a specific image processing apparatus determines an operational state of other image processing apparatus, and changes an operational state thereof according to a number of other image processing apparatus in an active state (non-power save state).

In the following description, a printer will be explained as the image processing apparatus for processing an image according to image information input thereto, thereby printing on a specific recording medium.

First Embodiment

Figure 1:
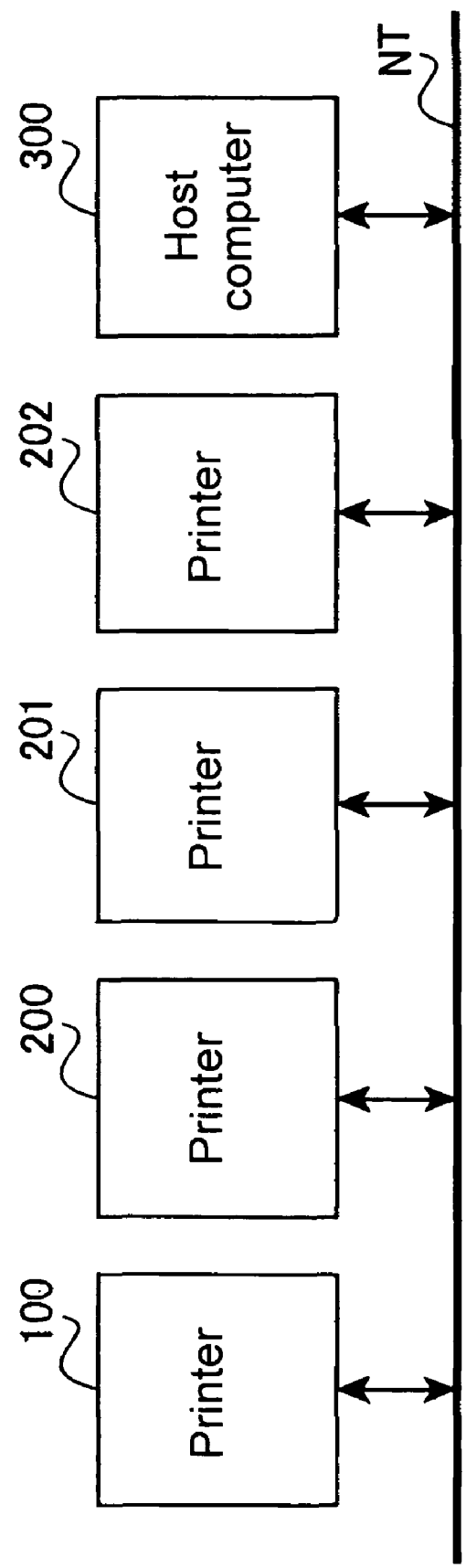
FIG. 1 is a block diagram showing an image processing system according to a first embodiment of the present invention.

A first embodiment of the present invention will be explained. FIG. 1 is a block diagram showing an image processing system according to the first embodiment of the present invention. As shown in FIG. 1, a plurality of printers 100, 200, 201, and 202 is connected to a host computer 300 through a specific network NT such as LAN (Local Area Network).

In the embodiment, the printers 200, 201, and 202 may be an ink-jet printer or a laser printer. The printers 200, 201, and 202 receive print data sent from a host device such as the host computer 300 connected thereto through the network NT, and process an image according to the print data, thereby printing on a recording medium such as a recording sheet.

In the embodiment, the host computer 300 may be a personal computer. The host computer 300 creates the print data using various application programs, and sends the print data to the printers 200, 201, and 202.

Figure 2:
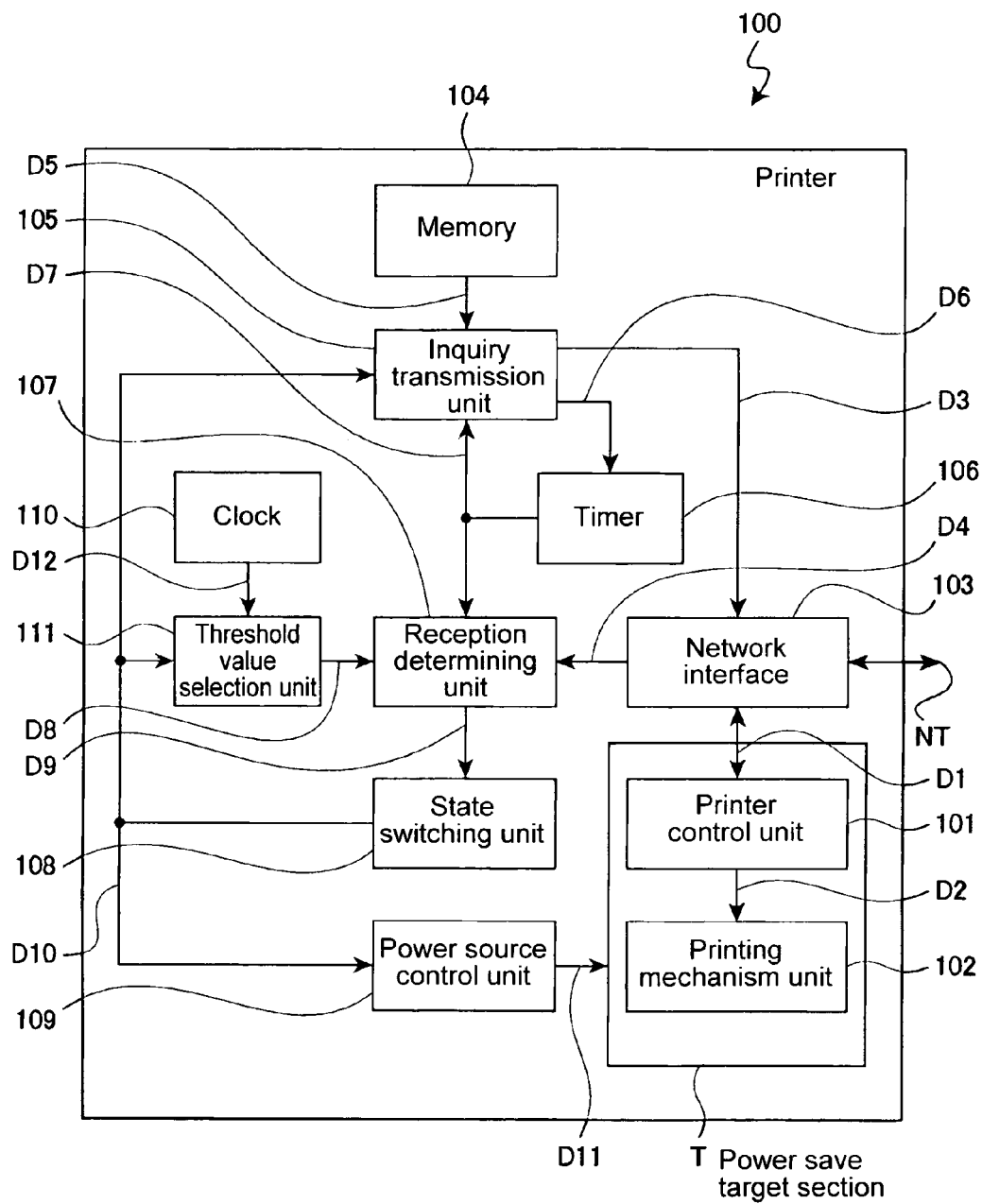
FIG. 2 is a block diagram showing a printer of the image processing system according to the first embodiment of the present invention.

FIG. 2 is a block diagram showing the printer 100 of the image processing system according to the first embodiment of the present invention.

As shown in FIG. 2, the printer 100 includes a printer control unit 101 for controlling a printing process; a printing mechanism unit 102 for printing on a recording medium such as a recording sheet according to the print data thus input; a network interface 103 for receiving and sending data through the network NT; a memory 104 as an apparatus information storage unit for storing network address information of the printers 200, 201, and 202; and an inquiry transmission unit 105 as an inquiry unit for inquiring an operational state of the printers 200, 201, and 202 with network addresses stored in the memory 104 as destinations.

In the embodiment, the printer 100 further includes a timer 106 as a time measurement unit for measuring an elapsed time from when the inquiry transmission unit 105 inquires according to a direction of the inquiry transmission unit 105; a reception determining unit 107 as a determining unit for determining contents of data received from the network NT; a state switching unit 108 as a switching control unit for switching an operation state of the printer 100 between an active state and a power save state according to a determination result of the reception determining unit 107; a power source control unit 109 as the switching control unit for controlling power supply to a power save target section T according to a state of the state switching unit 108; a clock 110 as a time determining unit for determining a time; and a threshold value selection unit 111 as a selection unit for selecting a threshold value according to the time determined with the clock 110.

In the embodiment, the power save target section T is formed of the printer control unit 101 and the printing mechanism unit 102, and becomes the power save state or a power consumption saving state when data are not received for a specific period of time.

In the embodiment, the printer control unit 101 controls the printer 100 as a whole. Further, with respect to the network interface 103, the printer control unit 101 receives data to be transmitted externally through the network NT and network data D1 formed of data received from outside through the network NT. When the network data D1 are print data D2, the printer control unit 101 sends the print data D2 to the printing mechanism unit 102.

In the embodiment, the printing mechanism unit 102 performs a printing operation on a specific recording medium such as a sheet according to the print data D2 sent from the printer control unit 101 and received from the host computer 300 through the network NT.

When the printing mechanism unit 102 performs the printing process through electro-photography, the printing mechanism unit 102 is formed of a series of mechanisms for using charged toner to form an image on the recording medium, and thermally fixing a toner image formed on the recording medium, thereby producing a printed sheet. When the printing mechanism unit 102 performs the print process through ink-jet, the printing mechanism unit 102 is formed of a series of mechanisms for discharging ink droplets to the recording medium, thereby producing a printed sheet.

In the embodiment, under control of the printer control unit 101, the network interface 103 sends and receives the print data D2 and various command data through the network NT. More specifically, according to an inquiry request signal D3 and the network data D1 sent from the inquiry transmission unit 105, the network interface 103 sends data indicating contents thus requested to the network NT. Further, according to the data received from the network NT, the network interface 103 sends the network data D1 to the printer control unit 101, and sends received data D4 to the reception determining unit 107.

Figure 3:
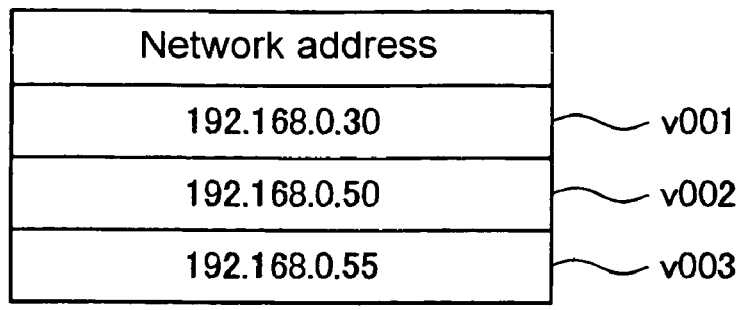
FIG. 3 is a schematic view showing a configuration of information stored in a memory of the printer according to the first embodiment of the present invention.

FIG. 3 is a schematic view showing a configuration of information stored in the memory 104 of the printer 100 according to the first embodiment of the present invention.

In the embodiment, the memory 104 is formed of, for example, a flash memory for storing the network addresses of the printers 200, 201, and 202. More specifically, as shown in FIG. 3, the memory 104 stores network address information v001, v002, and v003 corresponding to the printers 200, 201, and 202, respectively. The inquiry transmission unit 105 reads the information stored in the memory 104 as memory data D5.

In the embodiment, the inquiry transmission unit 105 sends the inquiry request signal D3 to the network interface 103, so that the inquiry transmission unit 105 inquires operational states of the printers 200, 201, and 202 designated as the network addresses read from the memory 104 as the memory data D5.

When the printers 200, 201, and 202 are in the power save state, the printers 200, 201, and 202 do not respond to the inquiry request signal D3 sent from the printer 100, or respond as being in the power save state. When the printers 200, 201, and 202 are turned off and become a terminated state, or have a trouble in a network communication function, the printers 200, 201, and 202 do not respond to the inquiry request signal D3 sent from the printer 100. When the printers 200, 201, and 202 have a trouble inside the printer, the printers 200, 201, and 202 respond as having the trouble. Further, the inquiry transmission unit 105 sends a time measurement start signal D6 to the timer 106 to direct the timer 106 to newly measure a time.

In the embodiment, the timer 106 measures an elapsed time according to the time measurement start signal D6 sent from the inquiry transmission unit 105. Time data D7 indicating the elapsed time measured with the timer 106 are sent to the inquiry transmission unit 105 and the reception determining unit 107.

In the embodiment, the reception determining unit 107 determines contents of the received data D4 received from the network NT through the network interface 103. More specifically, when the received data D4 are response data as an inquiry result with respect to the inquiry request signal D3, the reception determining unit 107 determines the operational states of the printers 200, 201, and 202 according to the response data. Then, according to the determination result and threshold data D8 sent from the threshold value selection unit 111, the reception determining unit 107 sends a state switching direction signal D9 to the state switching unit 108 for directing a transition from the power save state to the active state or from the active state to the power save state.

In the embodiment, the state switching unit 108 switches between the power save state and the active state according to the state switching direction signal D9 sent from the reception determining unit 107. Then, the state switching unit 108 sends a power save state signal D10 indicating the power save state to the inquiry transmission unit 105, the power source control unit 109, and the threshold value selection unit 111.

In the embodiment, according to on/off of the power save state signal D10 sent from the state switching unit 108, the power source control unit 109 supplies or shuts down power source power D11 to the power save target section T, thereby switching the operational state of the printer 100 between the active state and the power save state. The clock 110 measures a time, and sends time information D12 indicating a current time to the threshold value selection unit 111.

In the embodiment, according to on/off of the power save state signal D10 sent from the state switching unit 108 and the time information D12 sent from the clock 110, the threshold value selection unit 111 selects a threshold value according to a number of printers to be in the active state among the printers connected to the network NT. Then, the threshold value selection unit 111 sends threshold value data D8 indicating the threshold value to the reception determining unit 107.

In the embodiment, the printer 100 regularly performs a transition confirmation process for confirming whether the operational state changes to the power save state. The transition confirmation process will be explained next with reference to FIG. 4 and FIG. 5.

Figure 4:
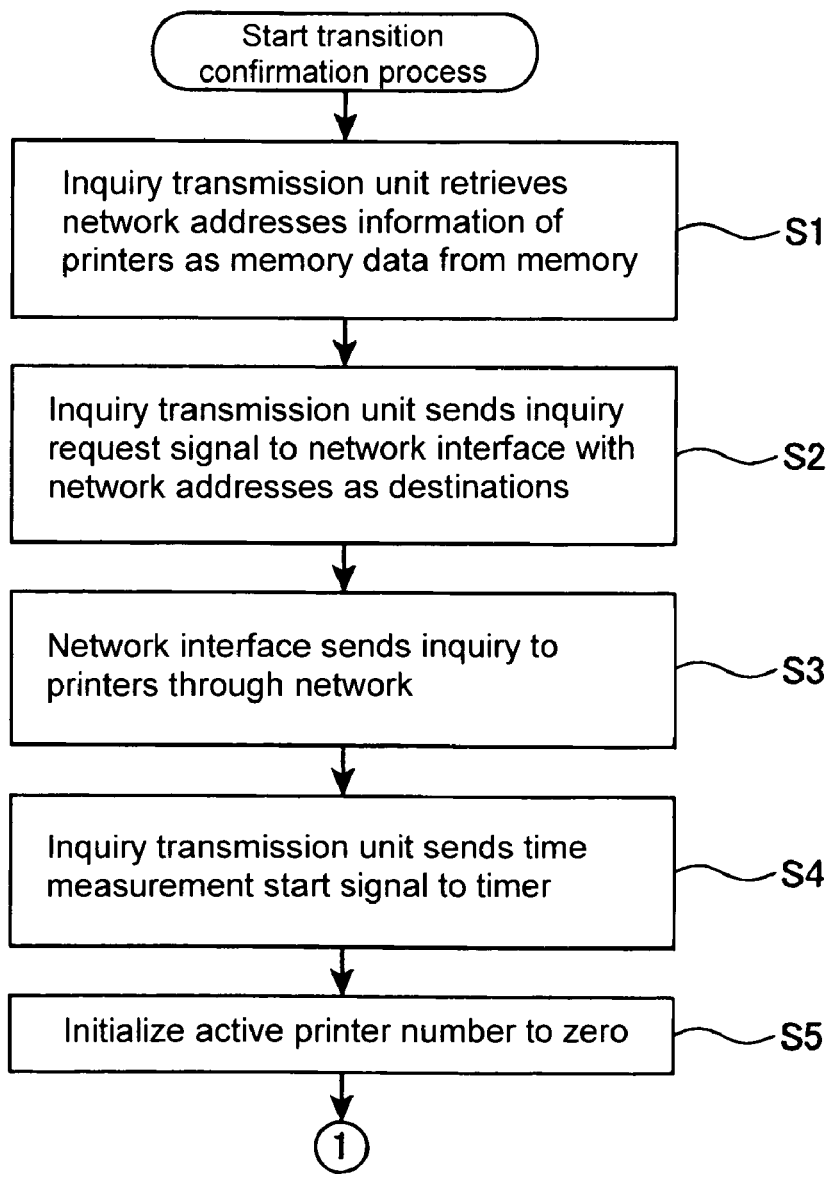
FIG. 4 is a flow chart No. 1 showing an operation of the printer in a transition confirmation process according to the first embodiment of the present invention.
Figure 5:
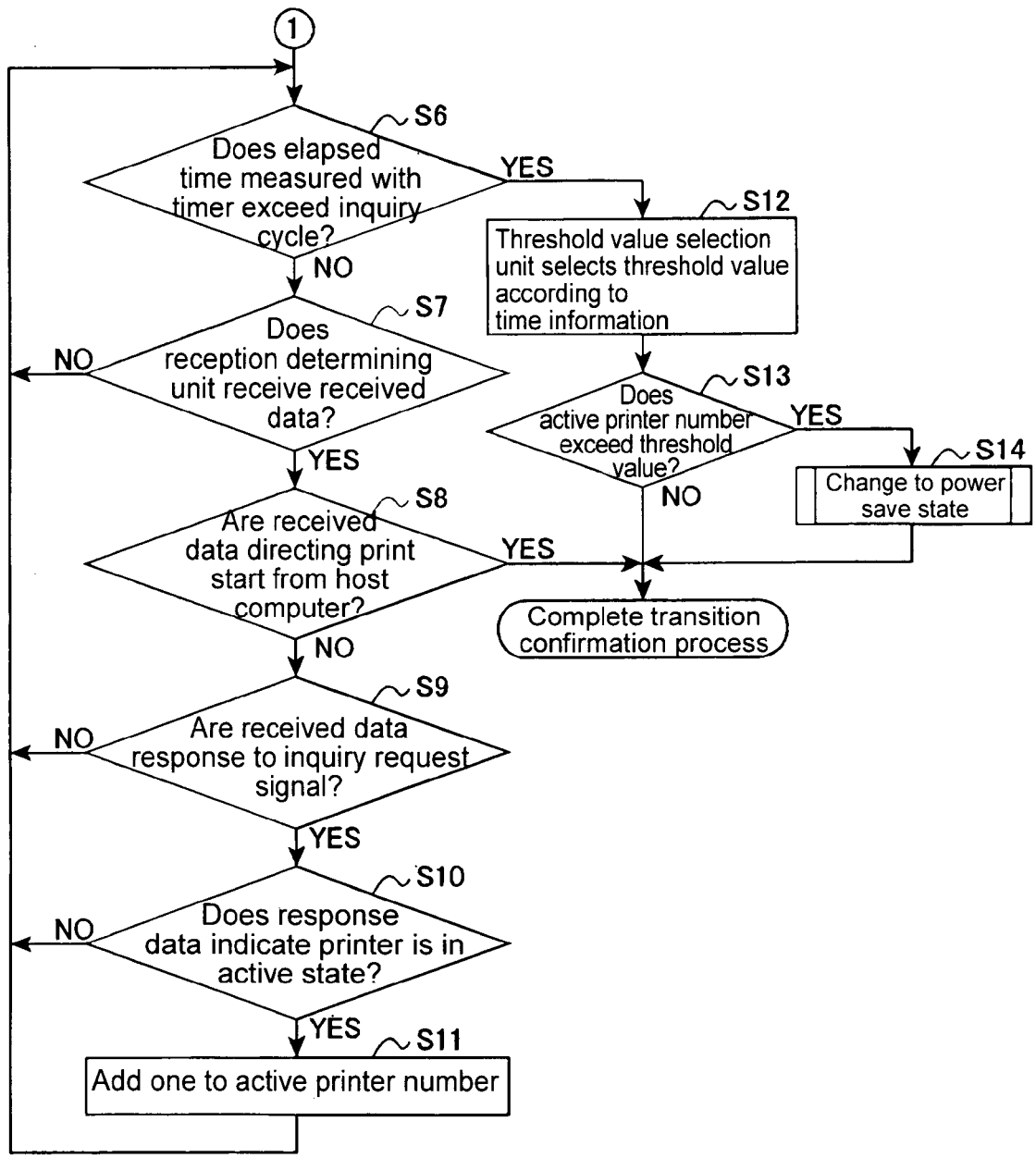
FIG. 5 is a flow chart No. 2 showing the operation of the printer in the transition confirmation process according to the first embodiment of the present invention.

FIG. 4 is a flow chart No. 1 showing an operation of the printer 100 in the transition confirmation process according to the first embodiment of the present invention. FIG. 5 is a flow chart No. 2 showing the operation of the printer 100 in the transition confirmation process according to the first embodiment of the present invention.

In step S1, the inquiry transmission unit 105 retrieves the network address information v001, v002, and v003 of the printers 200, 201, and 202 as the memory data D5 from the memory 104. In step S2, the inquiry transmission unit 105 sends the inquiry request signal D3 to the network interface 103 with addresses indicated by the network address information v001, v002, and v003 read from the memory 104 as the destinations. In step S3, the network interface 103 sends the inquiry request signal D3 to the printers 200, 201, and 202 through the network NT.

In the embodiment, the network address information v001, v002, and v003 read from the memory 104 indicate the addresses specifying the printers 200, 201, and 202, respectively. Alternatively, in the printer 100, information indicating a group address containing the printers 200, 201, and 202 may be stored in the memory 104, so that the inquiry transmission unit 105 retrieves the information. Further, in step S1, the inquiry transmission unit 105 retrieves the entire network address information v001, v002, and v003. Alternatively, in the printer 100, the inquiry transmission unit 105 may repeatedly retrieve the network address information from the memory 104 and send the inquiry request signal D3 per inquiry.

In step S4, after the inquiry transmission unit 105 sends the inquiry request signal D3 with the addresses indicated by the network address information v001, v002, and v003 read from the memory 104 as the destinations, the inquiry transmission unit 105 sends the time measurement start signal D6 to the timer 106. Accordingly, the timer 106 initializes the time data D7 stored therein, and starts measuring the elapsed time.

In step S5, when the time data D7 is initialized, the reception determining unit 107 initializes an active printer number as a variable indicating the number of printers in the active state among the printers connected to the network NT, thereby waiting for a response from the printers 200, 201, and 202.

In step S6, the reception determining unit 107 determines whether the elapsed time indicated by the time data D7 measured with the timer 106 exceeds a predetermined inquiry cycle for waiting the response from the printers 200, 201, and 202.

In step S7, when the elapsed time indicated by the time data D7 does not exceed the predetermined inquiry cycle, the reception determining unit 107 determines whether there are data received as the received data D4 from the network NT through the network interface 103. When there are not the data received as the received data D4, the reception determining unit 107 returns the process to step S6.

In step S8, when there are the data received as the received data D4, the reception determining unit 107 determines whether the received data D4 are data directing print start from the host computer 300. When the received data D4 are the data directing the print start, the transition confirmation process is completed, so that the printing mechanism unit 102 performs a printing process.

In step S9, when the received data D4 are not the data directing the print start, the reception determining unit 107 determines whether the received data D4 are response data with respect to the inquiry request signal D3. The response data from the printers 200, 201, and 202 have a configuration containing operational state information of an apparatus at the destination. The operational state information includes the power save state (not the active state), a terminated state, or a trouble happening state.

When the received data D4 are not the response data, the reception determining unit 107 returns the process to step S6 after performing a process of discarding or storing the received data D4. In step S10, when the received data D4 are the response data, the reception determining unit 107 determines whether the response data are data indicating that the printer sending the response data is in the active state. When the response data are not the data indicating the active state, the reception determining unit 107 returns the process to step S6 after performing a process according to the response data.

In step S11, when the response data are the data indicating the active state, the reception determining unit 107 returns the process to step S6 after adding one to the active printer number. In the embodiment, when the received data D4 are the response data with respect to the inquiry request signal D3, the reception determining unit 107 adds one to the active printer number. Alternatively, in the printer 100, the reception determining unit 107 may add a number other than one as far as capable of identifying a response number. Further, the reception determining unit 107 may subtract one from a specific number.

When the elapsed time indicated by the time data D7 measured with the timer 106 in step S6 exceeds the predetermined inquiry cycle, the reception determining unit 107 moves the process to step S12. In step S12, the threshold value selection unit 111 selects the threshold value according to the time information D12 indicating a current time sent from the clock 110. More specifically, the threshold value selection unit 111 selects a low value as the threshold value during nighttime when the number of printer users is small, and selects a high value as the threshold value during daytime when the number of printer users is large.

Figure 6:
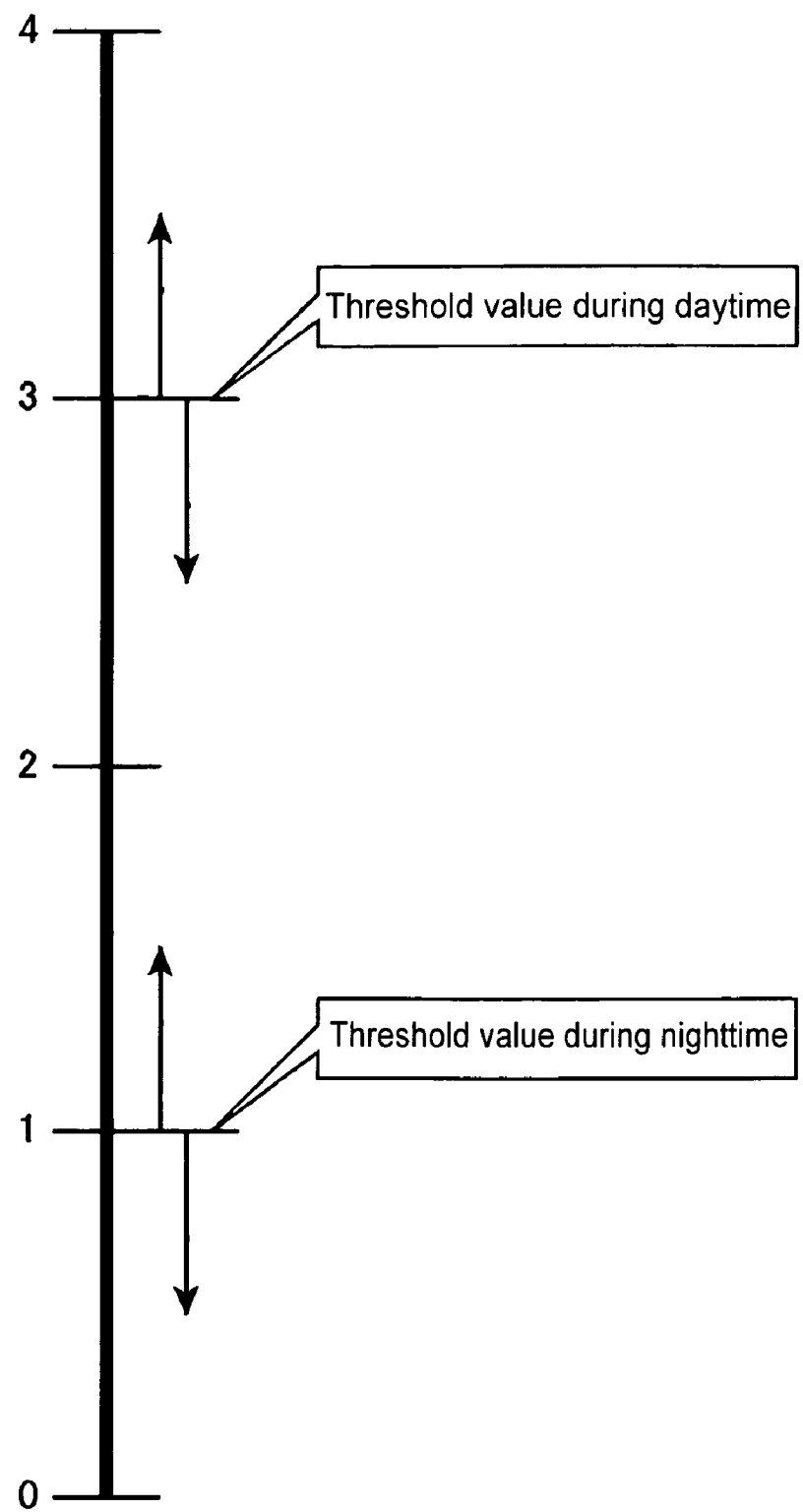
FIG. 6(A) is a table showing threshold values to be selected with a threshold value selection unit of the printer according to the first embodiment of the present invention.
FIG. 6(B) is a schematic view showing an operation of the printer performed based on the threshold value according to the first embodiment of the present invention.

FIG. 6(A) is a table showing the threshold values to be selected with the threshold value selection unit 111 of the printer 100 according to the first embodiment of the present invention. FIG. 6(B) is a schematic view showing an operation of the printer 100 performed based on the threshold value according to the first embodiment of the present invention.

As shown in FIGS. 6(A) and 6(B), when the current time indicated by the time information D12 is daytime, and the printer 100 is in the active state, the threshold value of 3 is selected. When the current time is nighttime, and the printer 100 is in the active state, the threshold value of 2 is selected. When the printer 100 is in the power save state, the threshold value of 1 is selected regardless of nighttime or daytime. In the printer 100, the threshold values are not limited thereto.

In step S13, the reception determining unit 107 compares the active printer number with the threshold value indicated by the threshold data D8 sent from the threshold value selection unit 111, and determines whether the active printer number exceeds the threshold value.

In step S14, when the active printer number exceeds the threshold value, it is indicated that a large number of the printers in the active state are connected to the network NT. Accordingly, the printer 100 changes to the power save state, thereby completing the transition confirmation process. When the active printer number is less than the threshold value, it is indicated that a small number of the printers in the active state are connected to the network NT. Accordingly, the printer 100 maintains the active state, thereby completing the transition confirmation process.

Through a series of the steps described above, the printer 100 performs the transition confirmation process regularly to confirm whether the printer 100 changes to the power save state. Accordingly, it is possible to control the number of the printers in the active state connected to the network NT within an appropriate range.

When the printer 100 changes to the power save state, the printer 100 performs a power saving process. The power saving process will be explained next with reference to FIG. 7 and FIG. 8.

Figure 7:
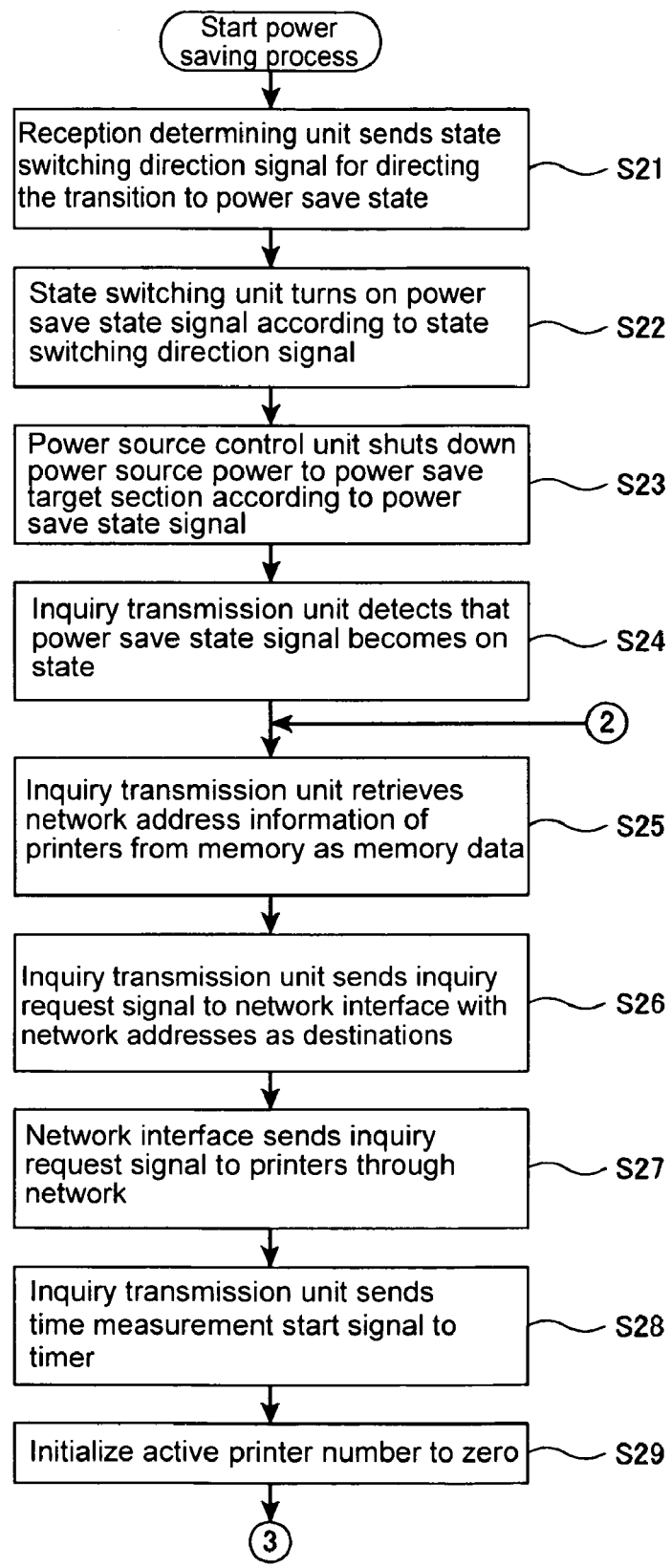
FIG. 7 is a flow chart No. 1 showing an operation of the printer in a power saving process according to the first embodiment of the present invention.
Figure 8:
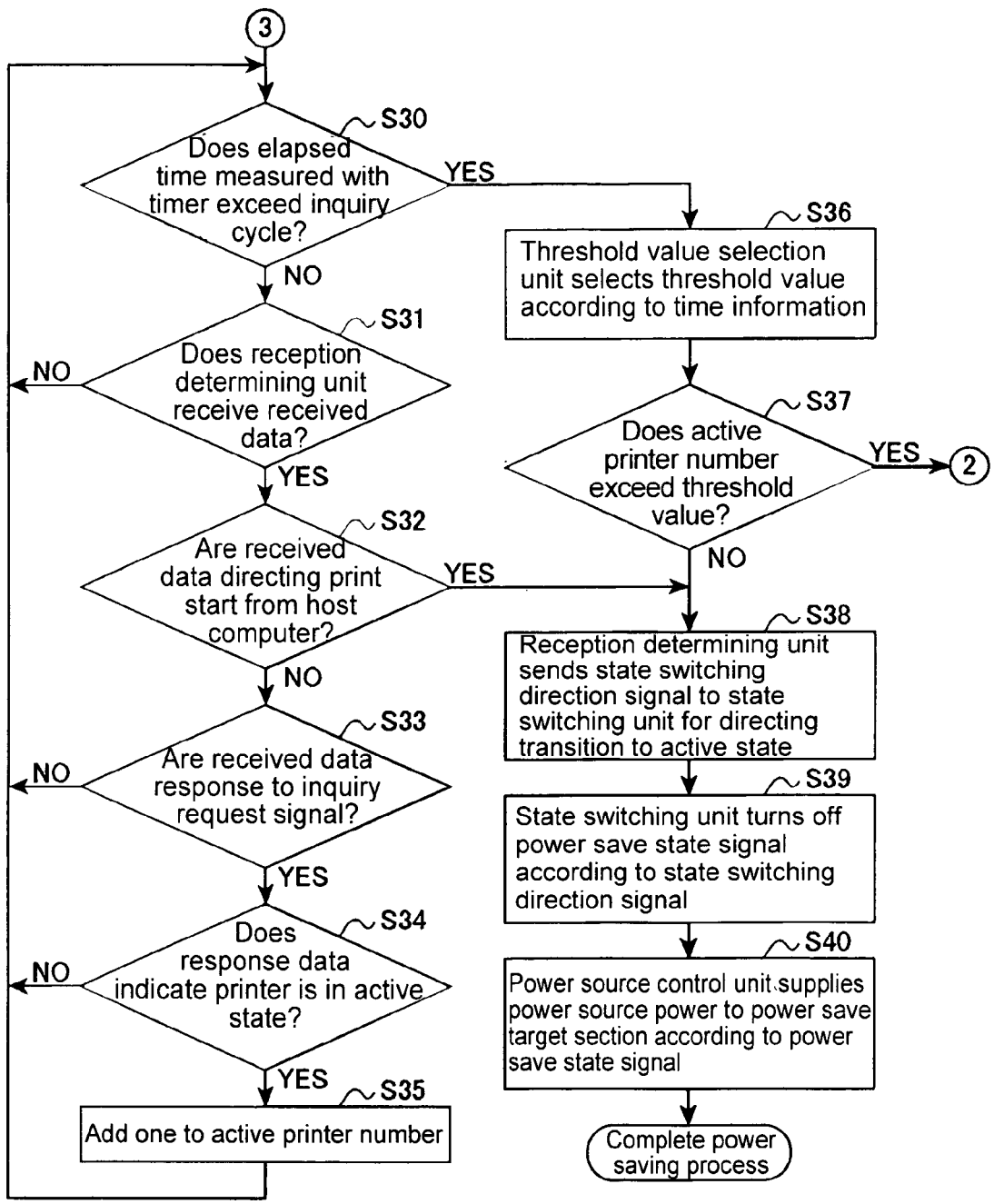
FIG. 8 is a flow chart No. 2 showing the operation of the printer in the power saving process according to the first embodiment of the present invention.

FIG. 7 is a flow chart No. 1 showing an operation of the printer 100 in the power saving process according to the first embodiment of the present invention. FIG. 8 is a flow chart No. 2 showing the operation of the printer 100 in the power saving process according to the first embodiment of the present invention.

In step S21, the reception determining unit 107 sends the state switching direction signal D9 to the state switching unit 108 as a comparison result between the active printer number and the threshold value for directing the transition to the power save state.

In step S22, the state switching unit 108 turns on the power save state signal D10 according to the state switching direction signal D9 sent from the reception determining unit 107. Then, the state switching unit 108 sends the power save state signal D10 to the inquiry transmission unit 105, the power source control unit 109, and the threshold value selection unit 111. Accordingly, the printer 100 is switched from the active state to the power save state.

In step S23, according to the power save state signal D10 sent from the state switching unit 108, the power source control unit 109 shuts down the power source power D11 to the power save target section T, thereby conserving power consumption thereof. In the embodiment, the power source control unit 109 shuts down the power source power D11 to the power save target section T, thereby conserving power consumption of the power save target section T. Alternatively, in the printer 100, it may be arranged to stop supplying a clock to the power save target section T, or to maintain a reset state, thereby conserving power consumption.

In step S24, the inquiry transmission unit 105 detects that the power save state signal D10 sent from the state switching unit 108 becomes an on state. In step S25, when the inquiry transmission unit 105 detects that the power save state signal D10 becomes the on state, the inquiry transmission unit 105 starts a first inquiry after the printer 100 changes to the power save state. More specifically, the inquiry transmission unit 105 retrieves the network address information v001, v002, and v003 of the printers 200, 201, and 202 from the memory 104 as the memory data D5.

In step S26, the inquiry transmission unit 105 sends the inquiry request signal D3 to the network interface 103 with the addresses indicated by the network address information v001, v002, and v003 read from the memory 104 as the destinations. In step S27, the network interface 103 sends the inquiry request signal D3 to the printers 200, 201, and 202 through the network NT.

In step S28, after the inquiry transmission unit 105 sends the inquiry request signal D3 with the addresses indicated by the network address information v001, v002, and v003 read from the memory 104 as the destinations, the inquiry transmission unit 105 sends the time measurement start signal D6 to the timer 106. Accordingly, the timer 106 initializes the time data D7 stored therein, and starts measuring the elapsed time.

In step S29, when the time data D7 is initialized, the reception determining unit 107 initializes the active printer number as the variable indicating the number of the printers in the active state among the printers connected to the network NT, thereby waiting for a response from the printers 200, 201, and 202.

In step S30, the reception determining unit 107 determines whether the elapsed time indicated by the time data D7 measured with the timer 106 exceeds a predetermined inquiry cycle for waiting the response from the printers 200, 201, and 202.

In step S31, when the elapsed time indicated by the time data D7 does not exceed the predetermined inquiry cycle, the reception determining unit 107 determines whether there are data received as the received data D4 from the network NT through the network interface 103. When there are not the data received as the received data D4, the reception determining unit 107 returns the process to step S30.

In step S32, when there are the data received as the received data D4, the reception determining unit 107 determines whether the received data D4 are the data directing the print start from the host computer 300. When the received data D4 are the data directing the print start, the reception determining unit 107 moves the process to step S38, so that the printing mechanism unit 102 performs the printing process according to the direction from the host computer 300, and performs a process for changing to the active state (described later).

In step S33, when the received data D4 are not the data directing the print start, the reception determining unit 107 determines whether the received data D4 are the response data with respect to the inquiry request signal D3. When the received data D4 are not the response data, the reception determining unit 107 returns the process to step S30 after performing the process of discarding or storing the received data D4.

In step S34, when the received data D4 are the response data, the reception determining unit 107 determines whether the response data are the data indicating that the printer sending the response data is in the active state. When the response data are not the data indicating the active state, the reception determining unit 107 returns the process to step S30 after performing a process according to the response data.

In step S35, when the response data are the data indicating the active state, the reception determining unit 107 returns the process to step S30 after adding one to the active printer number.

When the elapsed time indicated by the time data D7 measured with the timer 106 in step S30 exceeds the predetermined inquiry cycle, the reception determining unit 107 moves the process to step S36. In step S36, the threshold value selection unit 111 selects the threshold value according to the time information D12 indicating a current time sent from the clock 110. As described above, as shown in FIGS. 6(A) and 6(B), the threshold value selection unit 111 selects a low value as the threshold value during nighttime when the number of printer users is small, and selects a high value as the threshold value during daytime when the number of printer users is large.

In step S37, the reception determining unit 107 compares the active printer number with the threshold value indicated by the threshold data D8 sent from the threshold value selection unit 111, and determines whether the active printer number exceeds the threshold value.

When the active printer number exceeds the threshold value, it is indicated that a large number of the printers in the active state are connected to the network NT. Accordingly, the printer 100 maintains the power save state, thereby repeating the process from step S25. When the active printer number is less than the threshold value, it is indicated that a small number of the printers in the active state are connected to the network NT. Accordingly, in step S38, the reception determining unit 107 sends the state switching direction signal D9 to the state switching unit 108 as a comparison result between the active printer number and the threshold value for directing the transition to the active state.

In step S39, the state switching unit 108 turns off the power save state signal D10 according to the state switching direction signal D9 sent from the reception determining unit 107. Accordingly, the printer 100 is switched from the power save state to the active state. In step S40, the power source control unit 109 supplies the power source power D11 to the power save target section T, thereby completing the power saving process. When the printer 100 becomes the power save state, the printer 100 performs the power saving process described above, and returns to the active state when necessary.

Figure 9:
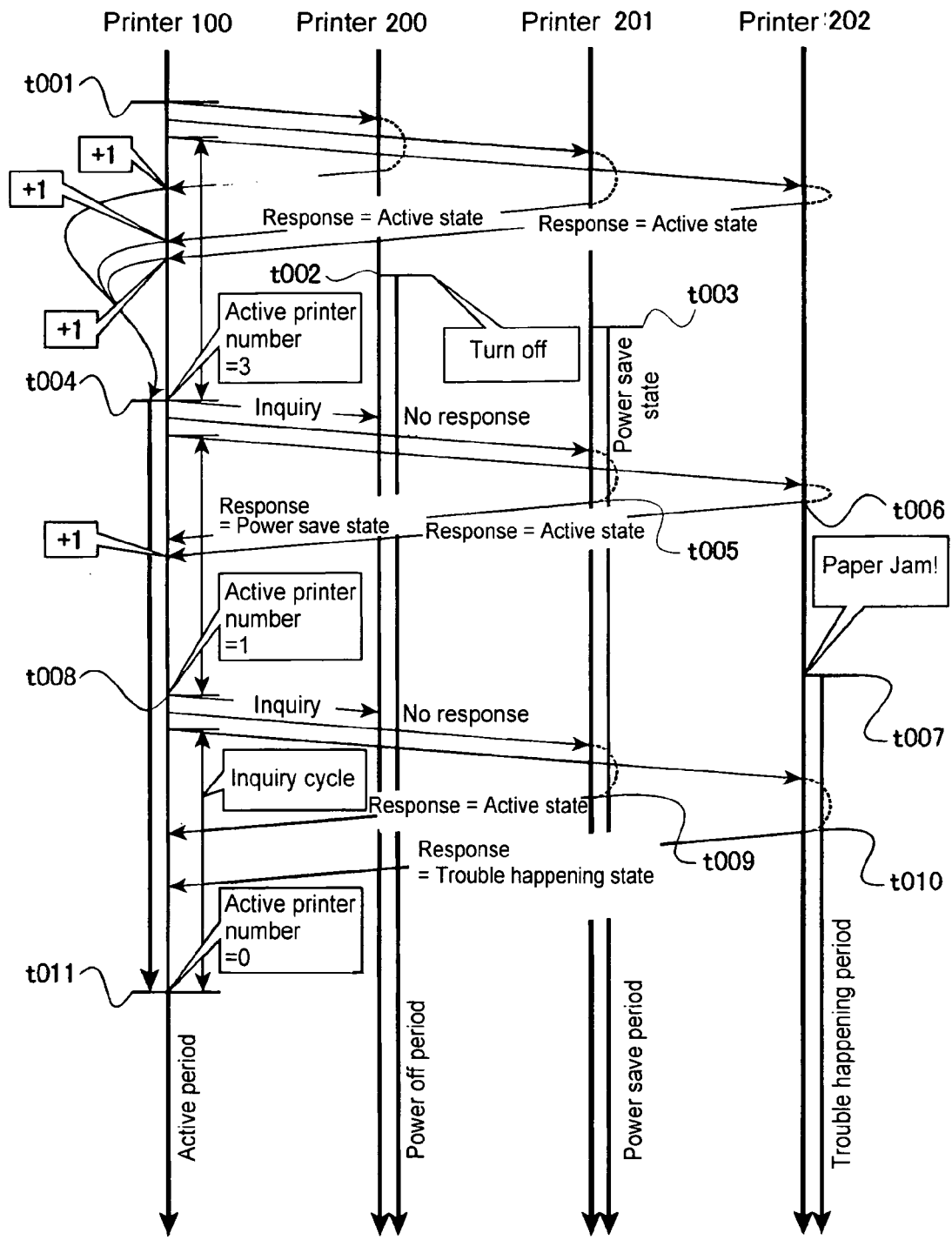
FIG. 9 is a time chart showing operations of a plurality of printers in the image processing system according to the first embodiment of the present invention.

FIG. 9 is a time chart showing operations of the printers 200, 201, and 202 in the image processing system according to the first embodiment of the present invention.

As shown in FIG. 9, when the printer 100 is in the active state, the printer 100 regularly inquires the operational states of the printers 200, 201, and 202 with the timer 106 at a timing t001. In this case, it is assumed that all of the printers 100, 200, 201, and 202 are in the active state.

As a result of the inquiry, it is determined that the active printer number is three, and is more than the threshold value selected with the threshold value selection unit 111. Accordingly, the printer 100 becomes the power save state from a timing t004.

Next, it is assumed that, after the printer 100 becomes the power save state, the printer 200 is turned off at a timing t002; the printer 201 becomes the power save state at a timing t003; and the printer 202 maintains the active state.

In this case, right after the inquiry transmission unit 105 detects that the power save state signal D10 sent from the state switching unit 108 becomes the on state, and the printer 100 becomes the power save state in step S24, the printer 100 inquires to the printers 200, 201, and 202. In response to the inquiry, since the printer 200 is turned off, the printer 200 does not respond. Since the printer 201 is in the power save state, the printer 201 responds to the inquiry from the printer 100 at a timing t005 that the printer 201 is in the power save state. Since the printer 202 is in the active state, the printer 202 responds to the inquiry from the printer 100 at a timing t006 that the printer 202 is in the active state.

When the printer 200 does not respond, and the printer 201 responds that the printer 201 is in the power save state, the printer 100 does not add to the active printer number. Further, the printer 202 is still in the active state, so that the active printer number becomes one.

When the inquiry cycle ends at a timing t008, the printer 100 determines the active printer number at the timing t008. In this case, the active printer number is one and less than the threshold value at the power save state. Accordingly, the printer 100 maintains the power save state.

Further, the printer 100 performs the next inquiry at the timing t008. It is assumed that the printer 202 has paper jam at a timing t007. In this case, the printer 200 is turned off and does not respond to the inquiry from the printer 100. The printer 201 is in the power save state, and responds to the inquiry from the printer 100 at a timing t009 that the printer 201 is in the power save state. Further, the printer 202 has paper jam, and responds to the inquiry from the printer 100 at a timing t010 that the printer 202 has a trouble.

When the printer 202 responds to the inquiry that the printer 202 has a trouble, the printer 100 changes the active printer number to zero at a timing t011. Accordingly, the active printer number becomes zero and less than the threshold value at the power save state, so that the printer 100 changes from the power save state to the active state.

As described above, the printer 100 sets the specific period of time with the timer 106 for receiving a response to the inquiry. When a printer does not respond within the specific period of time, the printer 100 regards the printer as not being in the active state. Accordingly, it is possible to always monitor the operational state of the printer having a specific communication capability.

Further, the printer 100 can determine whether the printer 100 itself maintains the power save state or changes to the active state. Accordingly, in the image processing system, when a plurality of printers having the function of the printer 100 is connected to the network NT, each of the printers operates individually, thereby eliminating a specific administration function.

As described above, in the image forming system in the embodiment, when the printer 100 is in the active state, the printer 100 inquires the operational state of the destinations stored in the memory 104. When the printer 100 receives more than the threshold value of responses indicating the active state, the printer 100 itself changes from the active state to the power saving state. Accordingly, it is not necessary to provide the printers 200, 201, and 202, other than the printer 100, with a special function, and to prevent an unnecessary number of printers from maintaining a high power consumption state at the same time.

Further, in the image forming system in the embodiment, when the printer 100 is in the power save state, the printer 100 inquires the operational state of the destinations stored in the memory 104. When the printer 100 does not receive more than the threshold value of responses indicating the active state, the printer 100 itself changes from the power saving state to the active state. Accordingly, it is not necessary to provide the printers 200, 201, and 202, other than the printer 100, with a special function, and to prevent all of the printers from becoming the power save state, thereby always securing the printer capable of dealing with an emergency situation.

Second Embodiment

A second embodiment of the present invention will be explained next. Components in the second embodiment similar to those in the first embodiment are designated with the same reference numerals, and explanations thereof are omitted. Explanations of operations and effects in the second embodiment similar to those in the first embodiment are omitted.

In the image processing system in the first embodiment, one specific printer inquires the operational states of other printers. In an image processing system in the second embodiment, one specific printer switches the operational state thereof between the power save state and the active state according to a notice from other printers indicating a change in the operational states thereof.

Figure 10:
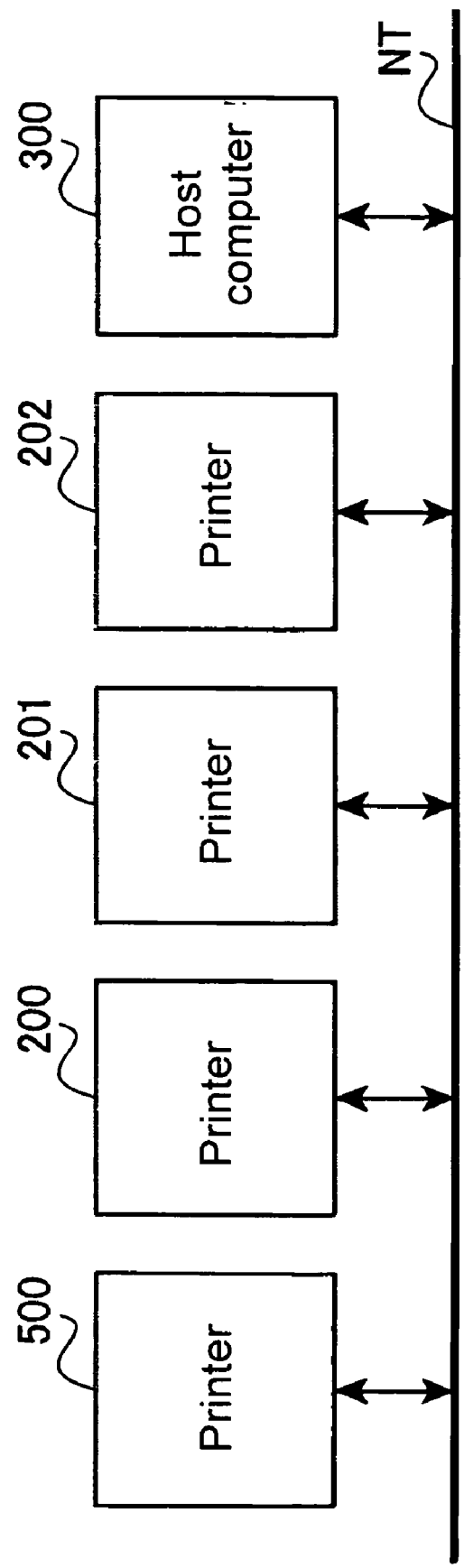
FIG. 10 is a block diagram showing an image processing system according to a second embodiment of the present invention.

FIG. 10 is a block diagram showing the image processing system according to a second embodiment of the present invention. As shown in FIG. 10, a plurality of printers 500, 100, 200, 201, and 202 is connected to the host computer 300 through a specific network NT such as LAN (Local Area Network).

Figures 11, 12:
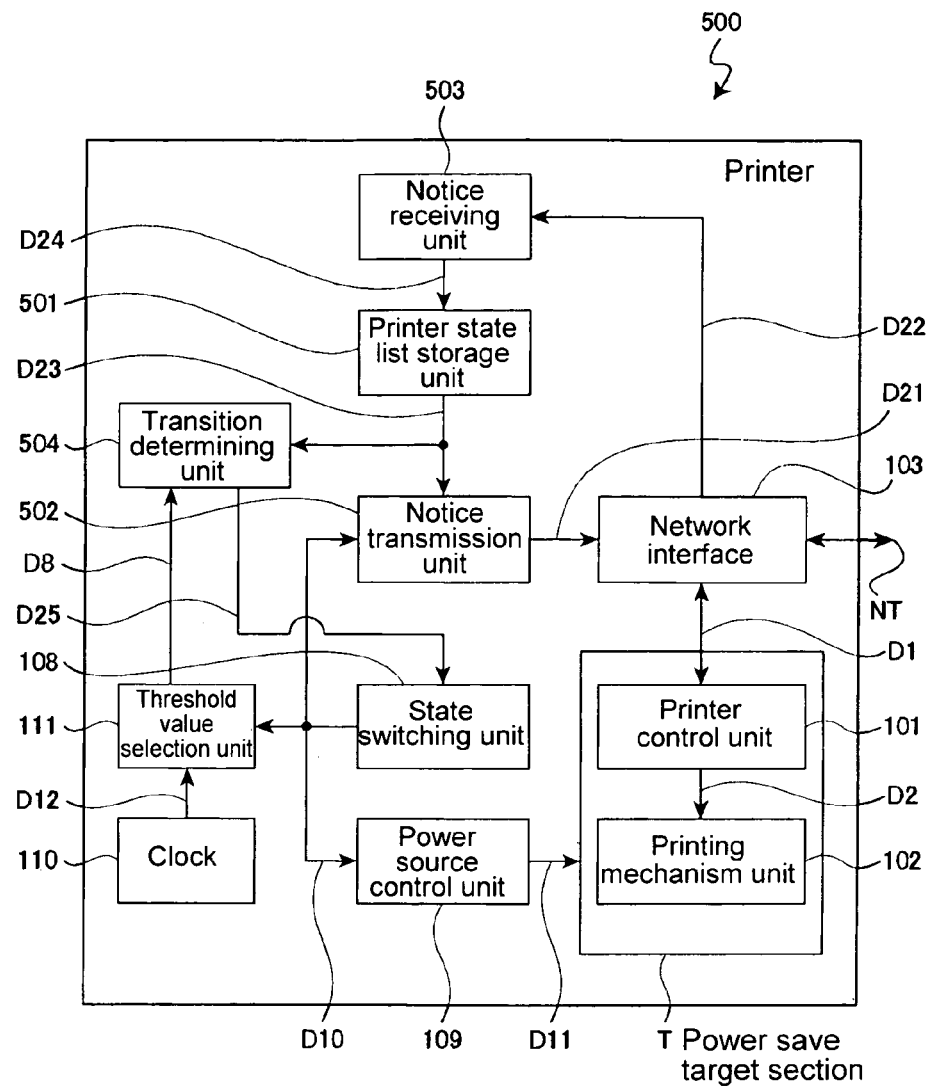
FIG. 11 is a block diagram showing a printer of the image processing system according to the second embodiment of the present invention.
FIG. 12 is a schematic view showing a configuration of information stored in a printer state list storage unit of the printer according to the second embodiment of the present invention.

FIG. 11 is a block diagram showing the printer 500 of the image processing system according to the second embodiment of the present invention.

As shown in FIG. 11, the printer 500 includes the printer control unit 101; the printing mechanism unit 102; the network interface 103; the state switching unit 108; the power source control unit 109; the clock 110; and the threshold value selection unit 111.

Further, the printer 500 includes a printer state list storage unit 501 as an operational state information storage unit for storing network address information and operational state information of the printers 200, 201, and 202; a notice transmission unit 502 for sending a notice to the printers 200, 201, and 202 indicating that the operational state of the printer 500 changes; a notice receiving unit 503 as an updating unit for updating contents of the printer state list storage unit 501 according to notices from the printers 200, 201, and 202 indicating that the operational states thereof change; and a transition determining unit 504 as a determining unit for determining whether the operational state of the printer 500 changes according to the operational state information stored in the printer state list storage unit 501.

In the embodiment, according to a notice request signal D21 and the network data D1 sent from the printer 500, the network interface 103 sends data indicating contents thus requested to the network NT. Further, according to data received from the network NT, the network interface 103 sends the network data D1 to the printer control unit 101, and sends received data D22 to the notice receiving unit 503.

FIG. 12 is a schematic view showing a configuration of information stored in the printer state list storage unit 501 of the printer according to the second embodiment of the present invention.

In the embodiment, the printer state list storage unit 501 is formed of, for example, a flash memory for storing the network address information and the operational state information of the printers 200, 201, and 202. More specifically, as shown in FIG. 12, the printer state list storage unit 501 stores the network address information v001, v002, and v003 and the operational state information v004, v005, and v006 corresponding to the printers 200, 201, and 202, respectively. Then, the notice transmission unit 502 and the transition determining unit 504 retrieve the information stored in the printer state list storage unit 501 as list data D23.

In the embodiment, the notice transmission unit 502 sends the notice request signal D21 to the network interface 103, so that the notice transmission unit 502 notifies a change in the operational state of the printer 500 with the network address retrieved from the printer state list storage unit 501 as the list data D23 as the destination.

In the embodiment, when the received data D22 received from the network NT through the network interface 103 are notices indicating changes in the operational states of the printers 200, 201, and 202, the notice receiving unit 503 generates update data D24 according to the notices. Then, the notice receiving unit 503 writes the update data D24 thus generated into the printer state list storage unit 501, thereby updating the contents stored in the printer state list storage unit 501.

In the embodiment, the transition determining unit 504 determines the number of the printers 200, 201, and 202 according to the operational state information retrieved from the transition determining unit 504 as the list data D23. According to the number, the transition determining unit 504 determines whether the operational state of the printer 500 is to be changed. Then, according to a determination result and the threshold data D8 sent from the threshold value selection unit 111, the transition determining unit 504 sends a state switching direction signal D25 to the state switching unit 108 for switching the operational state of the printer 500 from the power save state to the active state, or from the active state to the power save state.

In the embodiment, the state switching unit 108 switches the operational state from the power save state to the active state, or from the active state to the power save state according to the state switching direction signal D25 sent from the transition determining unit 504. Then, the state switching unit 108 sends the power save state signal D10 indicating the power save state to the notice transmission unit 502, the power source control unit 109, and the threshold value selection unit ill.

In the embodiment, according to the on/off of the power save state signal D10 sent from the state switching unit 108 and the time information D12 sent from the clock 110, the threshold value selection unit 111 selects a threshold value according to a number of printers in the active state among the printers connected to the network NT. Then, the threshold value selection unit 111 sends the threshold value data D8 indicating the threshold value to the transition determining unit 504.

In the embodiment, the printer 100 regularly performs the transition confirmation process for confirming whether the operational state is changed to the power save state. The transition confirmation process will be explained next with reference to FIG. 13 and FIG. 14.

Figure 13:
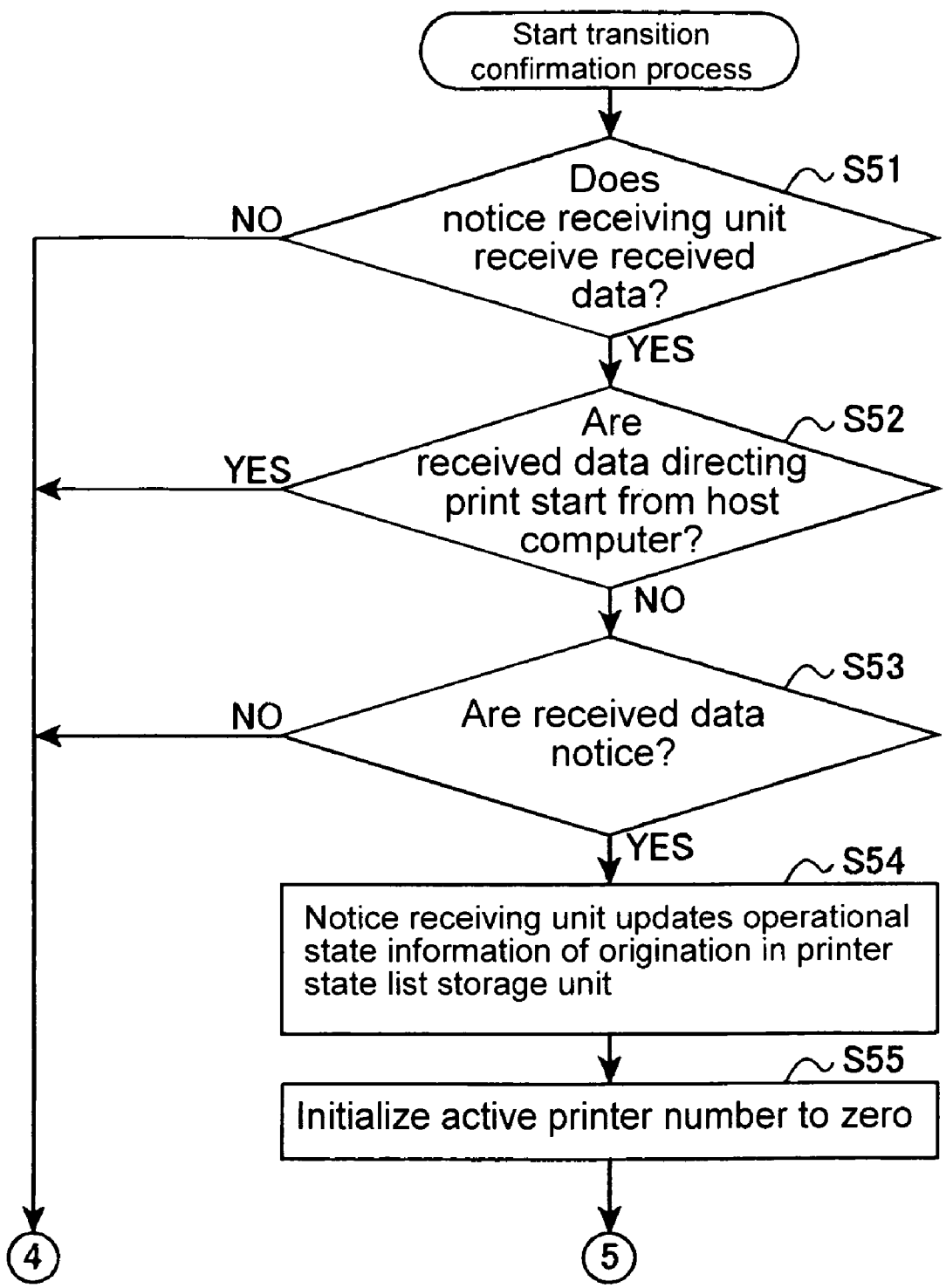
FIG. 13 is a flow chart No. 1 showing an operation of the printer in a transition confirmation process according to the second embodiment of the present invention.
Figure 14:
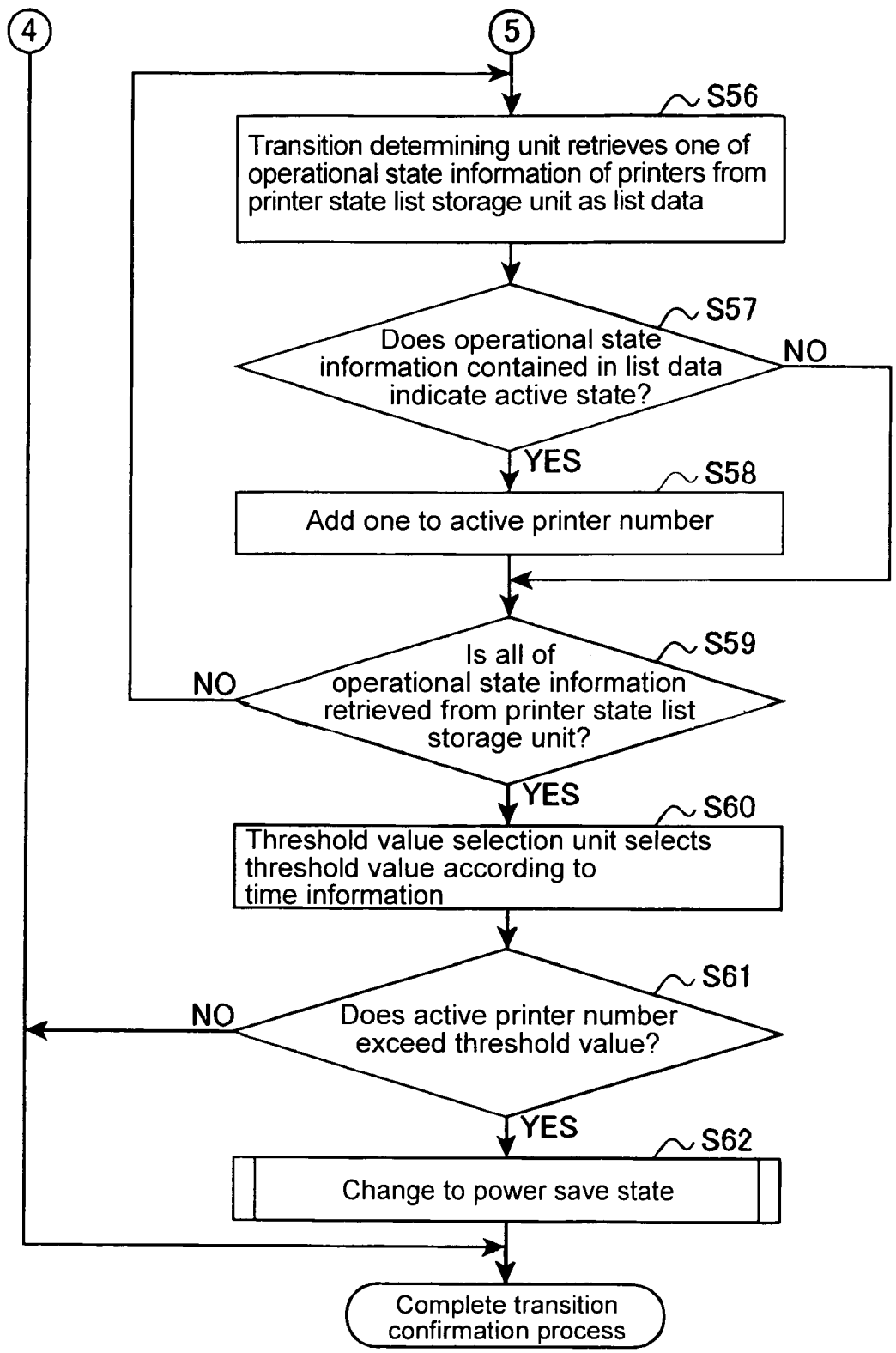
FIG. 14 is a flow chart No. 2 showing the operation of the printer in the transition confirmation process according to the second embodiment of the present invention.

FIG. 13 is a flow chart No. 1 showing an operation of the printer 500 in the transition confirmation process according to the second embodiment of the present invention. FIG. 14 is a flow chart No. 2 showing the operation of the printer 500 in the transition confirmation process according to the second embodiment of the present invention.

In step S51, the notice receiving unit 503 determines whether there are data received from the network NT through the network interface 103 as the received data D22. When there are not the data received as the received data D22, the notice receiving unit 503 completes the transition confirmation process.

In step S52, when there are the data received as the received data D22, the notice receiving unit 503 determines whether the received data D22 are data directing print start from the host computer 300. When the received data D22 are the data directing the print start, the notice receiving unit 503 completes the transition confirmation process, so that the printing mechanism unit 102 performs a printing process.

In step S53, when the received data D22 are not the data directing the print start, the notice receiving unit 503 determines whether the received data D22 are the notice indicating that the operational states of the printers 200, 201, and 202 change.

Figure 15:
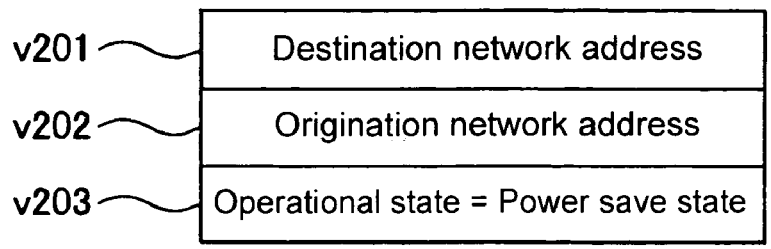
FIG. 15 is a schematic view showing a configuration of a notice indicating that an operational state changes according to the second embodiment of the present invention.

FIG. 15 is a schematic view showing a configuration of the notice indicating that the operational state changes according to the second embodiment of the present invention.

As shown in FIG. 15, the notice indicating that the operational states of the printers 200, 201, and 202 change includes network addresses v201 and v202 and operational state information v203 after the operational state of the origination apparatus changes. Further, the operational state information v203 includes the active state including a print direction waiting state; the power save state (not the active state); the terminated state; and the trouble happening state.

When the received data D22 are not the notice, the notice receiving unit 503 completes the transition confirmation process after performing a process of discarding or storing the received data D22. In step S54, when the received data D4 are the notice, the notice receiving unit 503 writes the network address information and the operational state information of the origination contained in the notice thus received as the update data D24 into the printer state list storage unit 501.

In step S55, after the notice receiving unit 503 updates the contents stored in the printer state list storage unit 501, the notice receiving unit 503 confirms the active printer number as a variable indicating the number of printers in the active state among the printers connected to the network NT. In this case, the notice receiving unit 503 initializes the active printer number to zero.

In step S56, the transition determining unit 504 retrieves one of the operational state information v104, v105, and v106 of the printers 200, 201, and 202 from the printer state list storage unit 501 as the list data D23. In step S57, the transition determining unit 504 determines whether the operational state information contained in the list data D23 indicates the active state. When the operational state information does not indicate the active state, the transition determining unit 504 moves the process to step S59.

In step S58, when the operational state information indicates the active state, the transition determining unit 504 adds one to the active printer number, and moves the process to step S59. In the embodiment, when the operational state information indicates the active state, the transition determining unit 504 adds one to the active printer number. Alternatively, in the printer 500, the transition determining unit 504 may add a number other than one as far as capable of identifying the number of printers in the active state. Further, the transition determining unit 504 may subtract one from a specific number.

In step S59, the transition determining unit 504 determines whether all of the operational state information is retrieved from the printer state list storage unit 501. When all of the operational state information is not retrieved, the transition determining unit 504 returns the process to step S56, so that next operational state information is retrieved from the printer state list storage unit 501.

More specifically, when it is assumed that the information shown in FIG. 12 is stored in the printer state list storage unit

501, in step S56, the transition determining unit 504 retrieves the network address information v101 and the operational state information v104 corresponding to the printer 200 from the printer state list storage unit 501 as the list data D23. In this case, the operational state information v104 indicates the active state. Accordingly, in step S58, the transition determining unit 504 adds one to the active printer number.

Further, in step S56, the transition determining unit 504 retrieves the network address information v102 and the operational state information v105 of the printer 201 from the printer state list storage unit 501 as the list data D23. In this case, the operational state information v105 indicates the power save state. Accordingly, the transition determining unit 504 does not add one to the active printer number. Similarly, in step S56, the transition determining unit 504 retrieves the network address information v103 and the operational state information v106 of the printer 202 from the printer state list storage unit 501 as the list data D23. In this case, the operational state information v106 indicates the trouble happening state. Accordingly, the transition determining unit 504 does not add one to the active printer number. As a result, according to the operational state information v004, v005, and v006 corresponding to the printers 200, 201, and 202, the active printer number becomes one.

When all of the operational state information is retrieved, the transition determining unit 504 moves the process to step S60 for determining the active printer number. In step S60, the threshold value selection unit 111 selects the threshold value according to the time information D12 indicating a current time sent from the clock 110. More specifically, as shown in FIGS. 6(A) and 6(B), the threshold value selection unit 111 selects a low value as the threshold value during nighttime when the number of printer users is small, and selects a high value as the threshold value during daytime when the number of printer users is large.

In step S61, the transition determining unit 504 compares the active printer number with the threshold value indicated by the threshold data D8 sent from the threshold value selection unit 111, and determines whether the active printer number exceeds the threshold value.

In step S62, when the active printer number exceeds the threshold value, it is indicated that a large number of the printers in the active state are connected to the network NT. Accordingly, the printer 500 changes to the power save state, thereby completing the transition confirmation process. When the active printer number is less than the threshold value, it is indicated that a small number of the printers in the active state are connected to the network NT. Accordingly, the printer 500 maintains the active state, thereby completing the transition confirmation process.

Through a series of the steps described above, the printer 500 performs the transition confirmation process regularly to confirm whether the printer 500 changes to the power save state. Accordingly, it is possible to control the number of the printers in the active state connected to the network NT within an appropriate range.

When the printer 500 changes to the power save state, the printer 500 performs a power saving process. The power saving process will be explained next with reference to FIG. 16 to FIG. 18.

Figure 16:
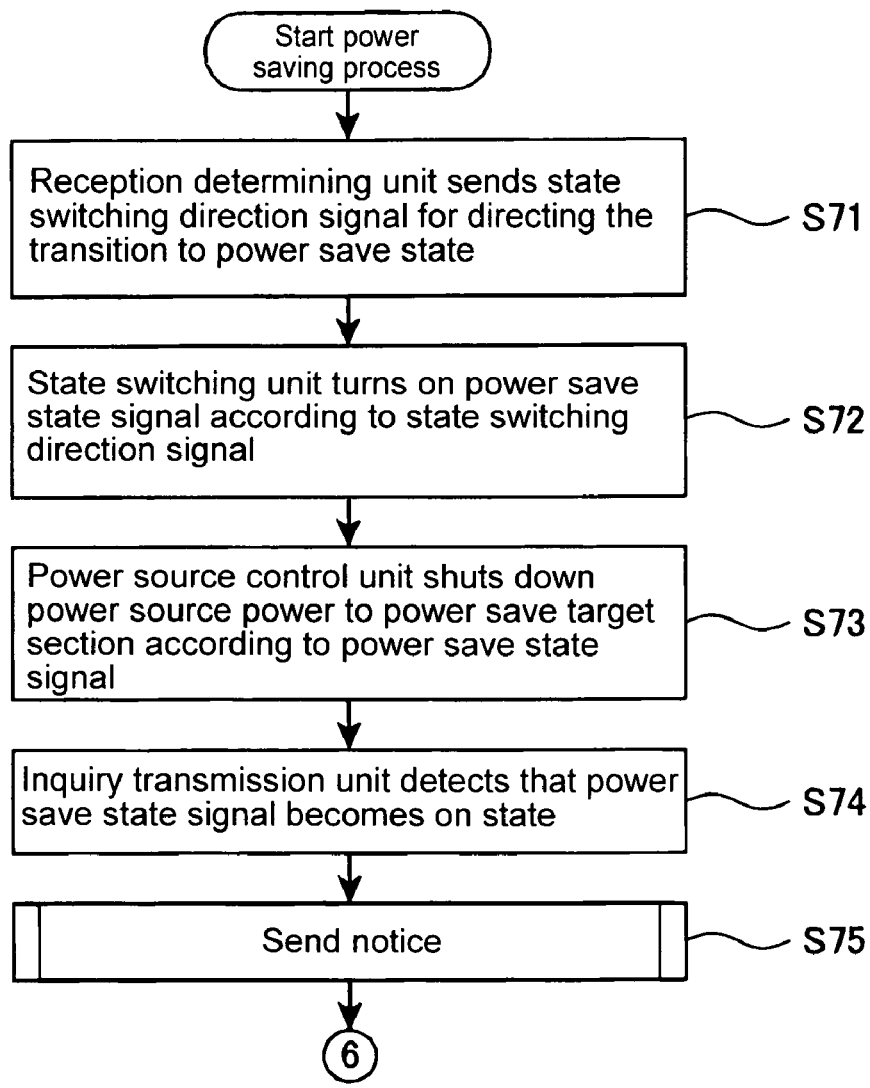
FIG. 16 is a flow chart No. 1 showing an operation of the printer in a power saving process according to the second embodiment of the present invention.
Figure 17:
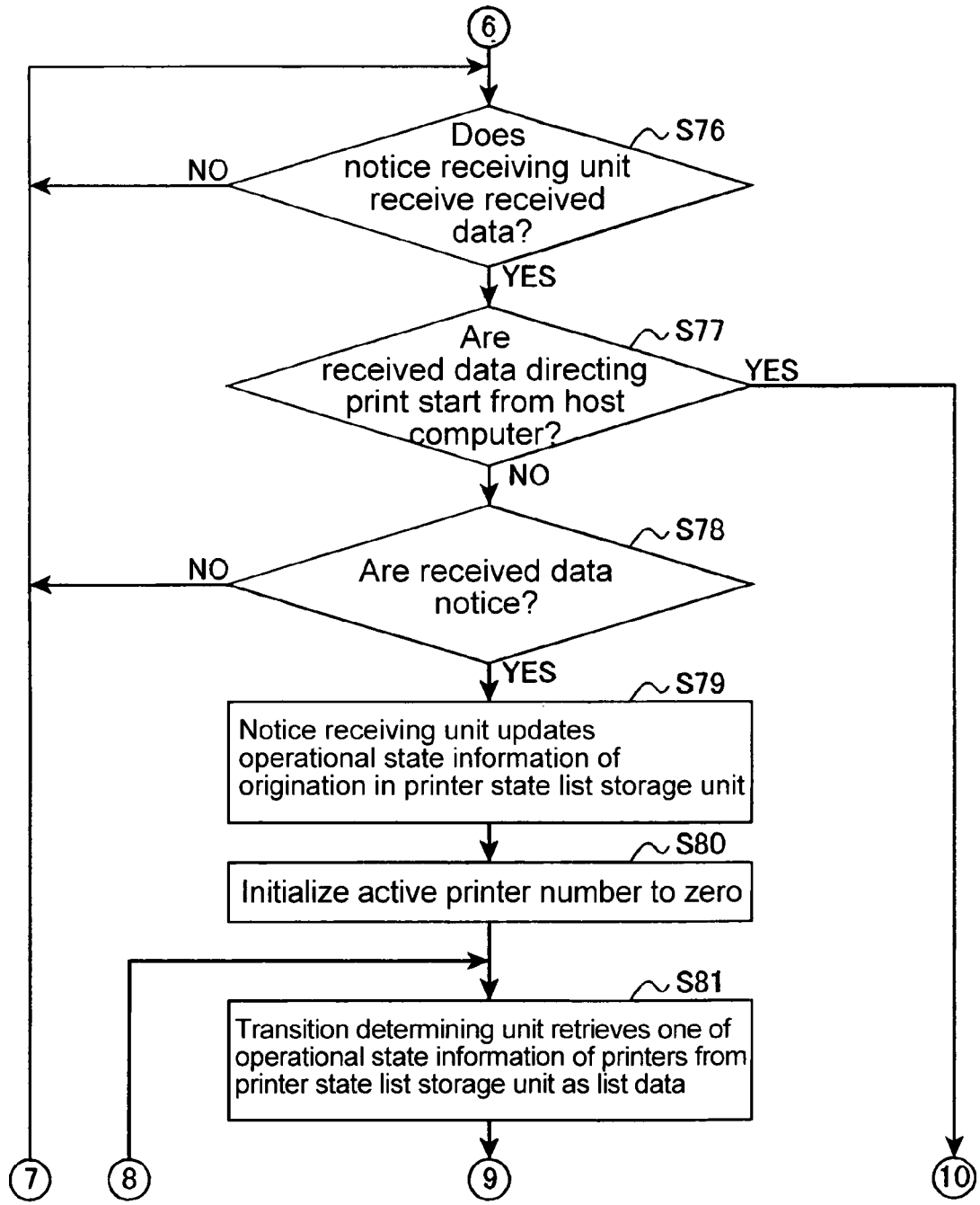
FIG. 17 is a flow chart No. 2 showing the operation of the printer in the power saving process according to the second embodiment of the present invention.
Figure 18:
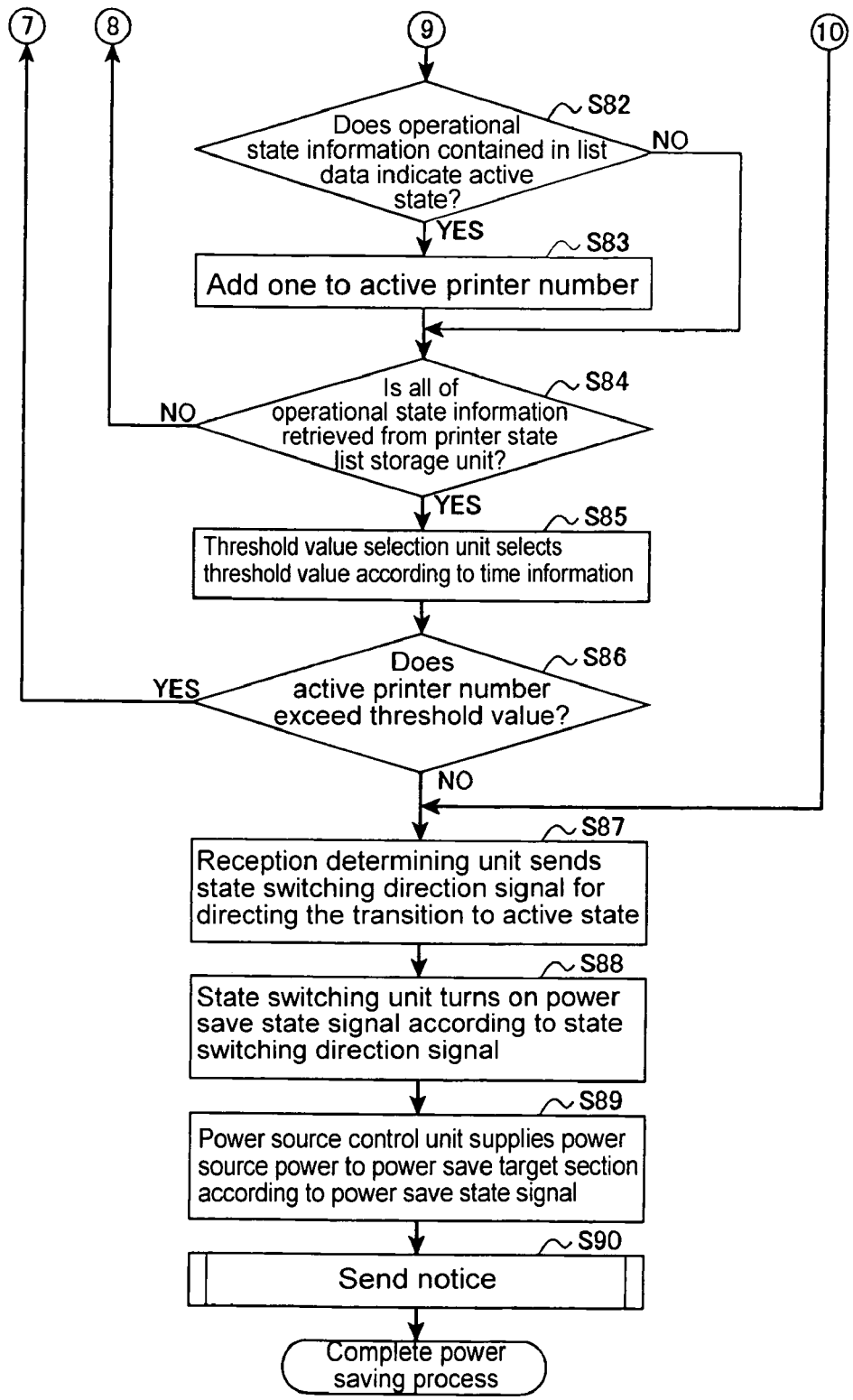
FIG. 18 is a flow chart No. 3 showing the operation of the printer in the power saving process according to the second embodiment of the present invention.

FIG. 16 is a flow chart No. 1 showing an operation of the printer 500 in the power saving process according to the second embodiment of the present invention. FIG. 17 is a flow chart No. 2 showing the operation of the printer 500 in the power saving process according to the second embodiment of the present invention. FIG. 18 is a flow chart No. 3 showing the operation of the printer 500 in the power saving process according to the second embodiment of the present invention.

In step S71, the transition determining unit 504 sends the state switching direction signal D25 to the state switching unit 108 as a comparison result between the active printer number and the threshold value for directing the transition to the power save state.

In step S72, the state switching unit 108 turns on the power save state signal D10 according to the state switching direction signal D25 sent from the transition determining unit 504. Then, the state switching unit 108 sends the power save state signal D10 to the notice transmission unit 502, the power source control unit 109, and the threshold value selection unit 111. Accordingly, the printer 500 is switched from the active state to the power save state.

In step S73, according to the power save state signal D10 sent from the state switching unit 108, the power source control unit 109 shuts down the power source power D11 to the power save target section T, thereby conserving power consumption of the power save target section T.

In step S74, the inquiry transmission unit 105 detects that the power save state signal D10 sent from the state switching unit 108 becomes an on state. In step S75, when the inquiry transmission unit 105 detects that the power save state signal D10 becomes the on state, the inquiry transmission unit 105 sends the notice indicating that the operational state of the printer 500 changes to the printers 200, 201, and 202. In this case, the notice has the configuration shown in FIG. 15, and the operational state information indicates the power save state.

In step S76, the notice receiving unit 503 determines whether there are data received from the network NT through the network interface 103 as the received data D22. When there are not the data received as the received data D22, the notice receiving unit 503 repeats step S76.

In step S77, when there are the data received as the received data D22, the notice receiving unit 503 determines whether the received data D22 are data directing the print start from the host computer 300. When the received data D22 are the data directing the print start, the notice receiving unit 503 proceeds the process to step S87 shown in FIG. 18, so that a printing process is performed (described later).

In step S78, when the received data D22 are not the data directing the print start, the notice receiving unit 503 determines whether the received data D22 are the response indicating that the operational states of the printers 200, 201, and 202 change. When the received data D4 are not the notice, the notice receiving unit 503 returns the process to step S76 after performing a process of discarding or storing the received data D22.

In step S79, when the received data D22 are the notice, the notice receiving unit 503 writes the network address information and the operational state information of the origination contained in the notice thus received as the update data D24 into the printer state list storage unit 501. In step S80, after the notice receiving unit 503 updates the contents stored in the printer state list storage unit 501, the notice receiving unit 503 initializes the active printer number to zero.

In step S81, the transition determining unit 504 retrieves one of the operational state information v104, v105, and v106 of the printers 200, 201, and 202 from the printer state list storage unit 501 as the list data D23. In step S82, as shown in FIG. 18, the transition determining unit 504 determines whether the operational state information contained in the list data D23 indicates the active state. When the operational state information does not indicate the active state, the transition determining unit 504 moves the process to step S84.

In step S83, when the operational state information indicates the active state, the transition determining unit 504 adds one to the active printer number, and moves the process to step S84. In step S84, the transition determining unit 504 determines whether all of the operational state information is retrieved from the printer state list storage unit 501. When all of the operational state information is not retrieved, the transition determining unit 504 repeats the process from step S81 shown in FIG. 17.

When all of the operational state information is retrieved from the printer state list storage unit 501, the transition determining unit 504 moves the process to step S85 for determining the active printer number. In step S85, the threshold value selection unit 111 selects the threshold value according to the time information D12 indicating a current time sent from the clock 110. More specifically, as shown in FIGS. 6(A) and 6(B), the threshold value selection unit 111 selects a low value as the threshold value during nighttime when the number of printer users is small, and selects a high value as the threshold value during daytime when the number of printer users is large.

In step S86, the transition determining unit 504 compares the active printer number with the threshold value indicated by the threshold data D8 sent from the threshold value selection unit 111, and determines whether the active printer number exceeds the threshold value.

When the active printer number exceeds the threshold value, it is indicated that a large number of the printers in the active state are connected to the network NT. Accordingly, the printer 500 maintains the power save state, thereby repeating the process from step S76 shown in FIG. 17.

When the active printer number is less than the threshold value, it is indicated that a small number of the printers in the active state are connected to the network NT. Accordingly, in step S87, the transition determining unit 504 sends the state switching direction signal D25 to the state switching unit 108 as a comparison result between the active printer number and the threshold value for directing the transition to the active state.

In step S88, the state switching unit 108 turns off the power save state signal D10 according to the state switching direction signal D25 sent from the transition determining unit 504. Accordingly, the printer 500 is switched from the power save state to the active state.

In step S89, the power source control unit 109 supplies the power source power D11 to the power save target section T. In step S90, when the inquiry transmission unit 105 detects that the power save state signal D10 sent from the state switching unit 108 becomes an off state, the inquiry transmission unit 105 sends the notice indicating that the operational state of the printer 500 changes to the printers 200, 201, and 202, thereby completing the power saving process. In this case, the notice has the configuration shown in FIG. 15, and the operational state information indicates the active state.

As described above, when the printer 500 becomes the power save state, the printer 500 performs the power saving process, and moves to the active state if necessary.

Figure 19:
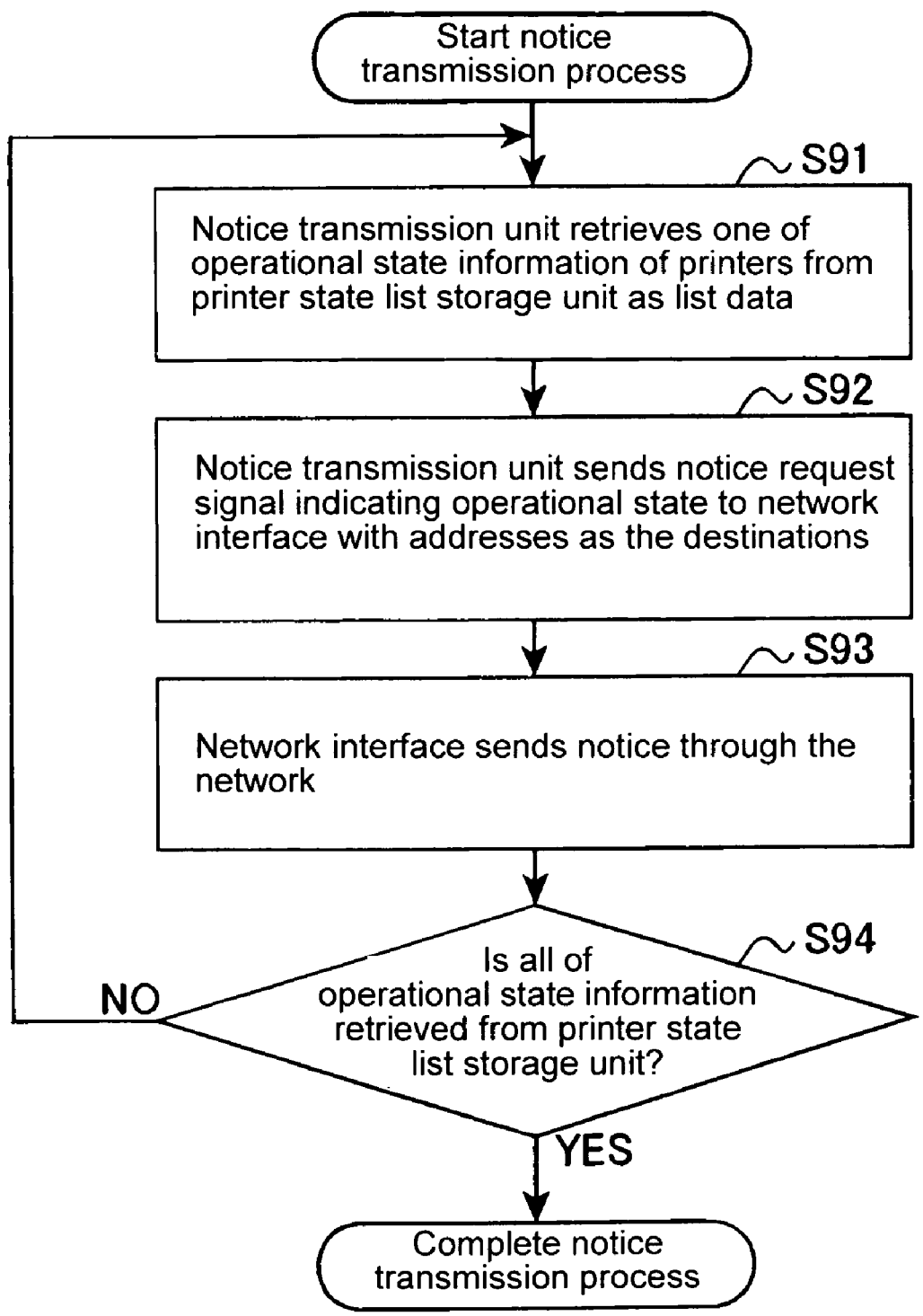
FIG. 19 is a flow chart showing an operation of the printer in a notice transmission process according to the second embodiment of the present invention.

In the embodiment, when the inquiry transmission unit 105 sends the notice indicating that the operational state of the printer 500 changes to the printers 200, 201, and 202 in step S75 shown in FIG. 16 or step S90 shown in FIG. 18, the printer 500 performs a notice transmission process shown in FIG. 19.

FIG. 19 is a flow chart showing an operation of the printer 500 in the notice transmission process according to the second embodiment of the present invention.

In step S91 shown in FIG. 19, the notice transmission unit 502 retrieves one of the operational state information v104, v105, and v106 of the printers 200, 201, and 202 from the printer state list storage unit 501 as the list data D23. In step S92, the notice transmission unit 502 sends the notice request signal D21 indicating the operational state of the printer 500 to the network interface 103 with addresses indicated by the network address information v001, v002, and v003 read from the printer state list storage unit 501 as the destinations. In step S93, the network interface 103 sends the notice request signal D21 to the printers 200, 201, and 202 through the network NT.

In step S94, the transition determining unit 504 determines whether all of the operational state information is retrieved from the printer state list storage unit 501. When all of the operational state information is not retrieved, the transition determining unit 504 repeats the process from step S91, so that all of the operational state information is retrieved from the printer state list storage unit 501. When all of the operational state information is retrieved, the transition determining unit 504 completes the notice transmission process.

As described above, in the embodiment, when the operational state of the printer 500 changes, the printer 500 performs the notice transmission process. Accordingly, it is possible to send the notice indicating the change to the printers 200, 201, and 202, thereby notifying the operational state thereof.

As described above, in the image processing system in the second embodiment, when the printer 500 is in the active state, the printer 500 sends the notice indicating the change in the operational state thereof to the printers 200, 201, and 202, instead of regularly inquiring. Further, instead of determining the response to the inquiry, the operational state information of the printers 200, 201, and 202 stored in the printer state list storage unit 501 is updated according to the notice indicating the change in the operational state of the printers 200, 201, and 202. When the operational state information indicating the active state is more than the threshold value, the printer 500 is switched from the active state to the power save state.

Accordingly, it is possible to prevent an unnecessary number of printers from maintaining a high power consumption state at the same time within a minimum period of time from when the operational state of the printer 500 changes.

Further, in the image processing system in the second embodiment, when the printer 500 is in the power save state, the printer 500 sends the notice indicating the change in the operational state thereof to the printers 200, 201, and 202, instead of regularly inquiring. Further, instead of determining the response to the inquiry, the operational state information of the printers 200, 201, and 202 stored in the printer state list storage unit 501 is updated according to the notice indicating the change in the operational state of the printers 200, 201, and 202. When the operational state information indicating the active state is less than the threshold value, the printer 500 is switched from power save state the to the active state.

Accordingly, it is not necessary to prevent all of the printers from becoming the power save state, thereby always securing the printer capable of dealing with an emergency situation within a minimum period of time from when the operational state of the printer 500 changes.

In the second embodiment described above, when an operational state of a printer changes, other printers are notified of the change. Alternatively, regardless of the change in the operational state, a printer may regularly notify other printers of an operational state thereof.

Third Embodiment

A third embodiment of the present invention will be explained next. Components in the third embodiment similar to those in the first and second embodiments are designated with the same reference numerals, and explanations thereof are omitted. Explanations of operations and effects in the third embodiment similar to those in the first and second embodiments are omitted.

Figure 20:
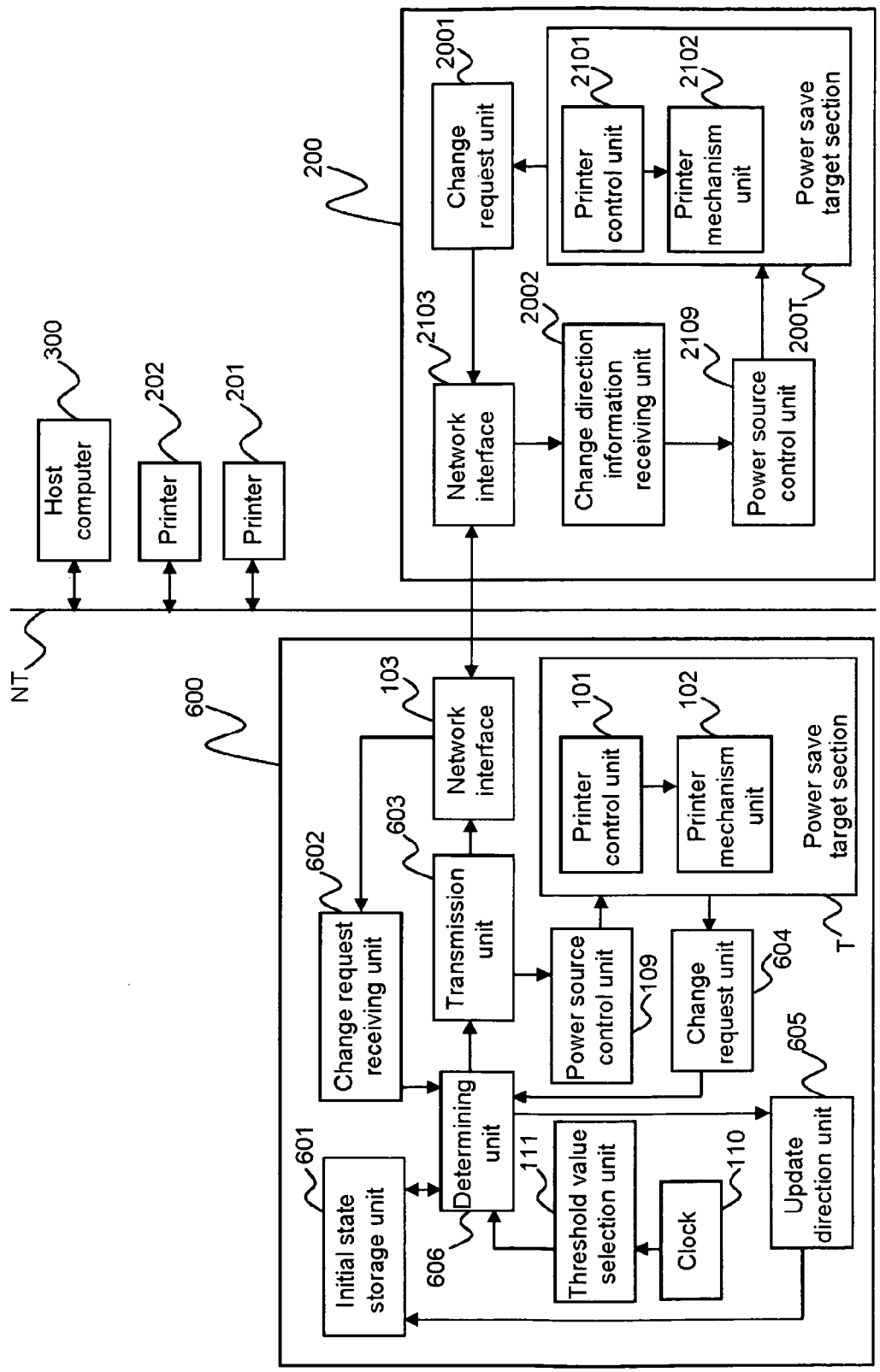
FIG. 20 is a block diagram showing an image processing system according to a third embodiment of the present invention.

FIG. 20 is a block diagram showing an image processing system according to the third embodiment of the present invention.

In the second embodiment, when one of the printers 200, 201, and 202 connected to the network becomes the operational state, the printer 100 is notified. In the third embodiment, as shown in FIG. 20, a printer 600, the printers 200, 201, and 202, and a host PC 300 are connected to communicate with each other through the network NT.

In the embodiment, when one of the printers 200, 201, and 202 changes to the operational state (for example, to the power save state), it is inquired to the printer 600 whether one of the printers 200, 201, and 202 may change to the power save state.

Then, only when the printer 600 sends a direction indicating that one of the printers 200, 201, and 202 may change to the power save state, one of the printers 200, 201, and 202 changes to the power save state. When the printer 600 sends a direction indicating that one of the printers 200, 201, and 202 may not change to the power save state, one of the printers 200, 201, and 202 does not change to the power save state.

As shown in FIG. 20, the printer 600 includes an initial state storage unit 601 for storing an initial operational state (or current operational state) of each of the apparatus on the network. For example, when one of the apparatus on the network (including the printer 600) is turned on first, the initial state of the one of the apparatus is stored in the initial state storage unit 601. More specifically, the initial state storage unit 601 stores information such as "the printer 600: active, the printer 200: active, the printer 201: active, the printer 202: active".

As shown in FIG. 20, the printer 200 includes a change request unit 2001, a network interface 2103, and a power save target section 200T formed of a printer control unit 2101 and a printing mechanism unit 2102. The printer 600 includes a change request receiving unit 602.

When the printer 200 changes to the power save state due to lack of the print data for a specific period of time, the power save target section 200T sends change request information inquiring whether the printer 200 may change to the power save state to the change request receiving unit 602 of the printer 600 through the change request unit 2001, the network interface 2103, and the network interface 103. Note that the printer control unit 2101 and the printing mechanism unit 2102 have configurations similar to those of the printer control unit 101 and the printing mechanism unit 102, respectively.

As shown in FIG. 20, the printer 600 further includes a determining unit 606. When the change request receiving unit 602 receives a change request, the change request receiving unit 602 sends the change request to the determining unit 606. The determining unit 606 determines whether the printer 200 may change to the power save state according to a number of the printers in the active state obtained from the operational state of each of the apparatus stored in the initial state storage unit 601 (four in this case) and a necessary number of the printers in the active state at a current time obtained from the threshold value selection unit 111 (for example, three during daytime according to FIG. 6(A)).

As shown in FIG. 20, the printer 200 further includes a change direction information receiving unit 2002 and a power source control unit 2109, and the printer 600 further includes a transmission unit 603. When the determining unit 606 determines that the printer 200 may change to the power save state, the determining unit 606 sends change direction information such as "the printer 200, active to power save, OK" to the change direction information receiving unit 2002 of the printer 200 through the transmission unit 603, the network interface 103, and the network interface 2103.

In the next step, the change direction information receiving unit 2002 sends the change direction information indicating that the printer 200 may change to the power save state to the power source control unit 2109. Accordingly, the power source control unit 2109 changes the power save target section 200T to the power save state.

In the embodiment, the printer 600 includes an update direction unit 605. When the determining unit 606 determines that the printer 200 may change to the power save state, the update direction unit 605 updates the initial state storage unit 601. Accordingly, the initial state storage unit 601 stores information such as "the printer 600: active, the printer 200: power save, the printer 201: active, the printer 202: active".

In the embodiment, the printer 600 further includes a change request unit 604. When the printer 600 itself changes the operational state thereof, the printer 600 sends a signal indicating that the printer 600 itself changes the operational state thereof to the determining unit 606 through the change request unit 604. Then, the determining unit 606 determines that the printer 600 may change to the operational state thereof, and sends a result to the power source control unit 109 through the transmission unit 603. Accordingly, the power source control unit 109 changes the operational state of the power save target section T of the printer 600.

In the embodiments described above, the present invention is applied to the printers 100 and 500 as the image processing apparatus for processing an image and printing on a specific recording medium according to image information thus input, and may be applicable to any apparatus capable of processing an image connected to a network. For example, the present invention is applicable to an image forming apparatus, an image inputting apparatus, an image communication apparatus, an image displaying apparatus, and the likes having multiple functions.

More specifically, the present invention is applicable to a network compatible apparatus such as a projector, a scanner, a digital camera, a digital video camera, a personal computer, a PDA (Personal Digital Assistant), a network storage device, an audio device, a mobile phone, a PHS (Personal Handyphone System), a watch-type PDA, a set-top box, a POS (Point of Sale) terminal, a copier, a facsimile, a telephone including an IP telephone, an exchange device, an NCU (Network Control Unit), a router, a hub, a bridge, and other network compatible apparatus.

The disclosure of Japanese Patent Application No. 2007-280194, filed on Oct. 29, 2007, is incorporated in the application by reference.

While the invention has been explained with reference to the specific embodiments of the invention, the explanation is illustrative and the invention is limited only by the appended claims.

What is claimed is:

1. An image processing apparatus connected to a specific network for processing an image according to image information, comprising:

an apparatus information storage unit for storing apparatus information of other apparatus connected to the network;

an inquiry unit for inquiring an operational state of the other apparatus according to the apparatus information stored in the apparatus information storage unit;

a determining unit for determining the operational state of the other apparatus according to an inquiry result of the inquiry unit;

a time determining unit for determining a time;

a selection unit for selecting a threshold according to the time, said selection unit being arranged to select a first threshold when the image processing apparatus is in a power save mode and a second threshold greater than the first threshold when the image processing apparatus is in an active mode; and a switching control unit for comparing the threshold with a number of apparatus among the other apparatus that the determining unit determines as being in the active state, and for switching an operational state of the image processing apparatus between the active state and the power save state.

2. The image processing apparatus according to claim 1, wherein said switching control unit is arranged to switch the operational state of the image processing apparatus to the active state when the number of the apparatus that the determining unit determines as being in the active state is less than the first threshold.

3. The image processing apparatus according to claim 1, wherein said switching control unit is arranged to switch the operational state of the image processing apparatus to the power save state when the number of the apparatus that the determining unit determines as being in the active state is equal to or greater than the second threshold.

4. The image processing apparatus according to claim 1, further comprising a time measurement unit for measuring an elapsed time from when the inquiry unit inquires the operational state of the other apparatus so that the inquiry unit regularly inquires the operational state of the other apparatus according to the elapsed time.

5. The image processing apparatus according to claim 1, said inquiry unit is arranged to inquire the operational state of the other apparatus when the operational state of the image processing apparatus is the power save state.

6. The image processing apparatus according to claim 1, wherein said determining unit is arranged to determine an operational state of the other apparatus as one of the active state, the power save state, a terminated state, and a trouble happening state.

7. The image processing apparatus according to claim 1, further comprising:

a change request receiving unit for receiving a change request from one of the other apparatus to change an operational state thereof;

wherein said determining unit is arranged to determine whether to change the operational state according to the change request and the number of the other apparatus in the active state.

8. The image processing apparatus according to claim 7, further comprising an update direction unit for directing to update the operational state when the determining unit determines to change the operational state.

9. The image processing apparatus according to claim 7, further comprising a change direction information transmission unit for sending determination information of the determining unit to the one of the other apparatus.

10. An image processing apparatus connected to a specific network for processing an image according to image information, comprising:

an operational state information storage unit for storing operational state information of other apparatus connected to the network;

a transmission unit for sending a notice to the other apparatus indicating that an operation state of the image processing apparatus changes;

an updating unit for updating the operational state information stored in the operational state information storage unit according to a notice from the other apparatus indicating that an operation state thereof changes;

a determining unit for determining a number of apparatus among the other apparatus in an active state according to the operational state information stored in the operational state information storage unit;

a time determining unit for determining a time;

a selection unit for selectins threshold according to the time, said selection unit being arranged to select a first threshold when the image processing apparatus is in a power save mode and a second threshold greater than the first threshold when the image processing apparatus is in an active mode; and a switching control unit for comparing the threshold with the number of apparatus that the determining unit determines as being in the active state, and for switching the operational state of the image processing apparatus between the active state and the power save state.

11. The image processing apparatus according to claim 10, wherein said switching control unit is arranged to switch the operational state of the image processing apparatus to the active state when the number of the apparatus that the determining unit determines as being in the active state is less than the first threshold.

12. The image processing apparatus according to claim 10, wherein said switching control unit is arranged to switch the operational state of the image processing apparatus to the power save state when the number of the apparatus that the determining unit determines as being in the active state is equal to or greater than the second threshold.

13. The image processing apparatus according to claim 10, wherein said determining unit is arranged to determine an operational state of the other apparatus as one of the active state, the power save state, a terminated state, and a trouble happening state.

* * * * *